United States Patent [19]
Periwal

[11] Patent Number: 6,163,776
[45] Date of Patent: Dec. 19, 2000

[54] SYSTEM AND METHOD FOR EXCHANGING DATA AND COMMANDS BETWEEN AN OBJECT ORIENTED SYSTEM AND RELATIONAL SYSTEM

[75] Inventor: Damodar D. Periwal, Campbell, Calif.

[73] Assignee: Software Tree, Inc., San Jose, Calif.

[21] Appl. No.: 09/046,779

[22] Filed: Mar. 23, 1998

[51] Int. Cl.⁷ .................................................. G06F 17/30
[52] U.S. Cl. .................................. 707/4; 707/6; 707/101; 707/103
[58] Field of Search .............................. 707/2, 3, 4, 101, 707/103, 6; 345/335, 968, 333, 349; 395/702; 711/1, 100; 364/280, 4

[56] References Cited

U.S. PATENT DOCUMENTS

| | | | |
|---|---|---|---|
| 5,201,046 | 4/1993 | Goldberg et al. | 395/600 |
| 5,291,583 | 3/1994 | Bapat | 395/500 |
| 5,499,371 | 3/1996 | Henninger et al. | 395/702 |
| 5,504,884 | 4/1996 | Kyuma et al. | 395/600 |
| 5,627,979 | 5/1997 | Chang et al. | 345/333 |
| 5,706,504 | 1/1998 | Atkinson et al. | 707/101 |
| 5,797,136 | 8/1998 | Boyer et al. | 707/2 |

*Primary Examiner*—Wayne Amsbury
*Assistant Examiner*—Thu-Thao Havan
*Attorney, Agent, or Firm*—Fenwick & West LLP

[57] ABSTRACT

A system for exchanging data and commands between an object oriented system and a relational system. The system includes an Object-Relational Mapping (ORM) grammar, an ORM specification, Object Class Definitions, a relational database, an operating system, a Database Exchange Unit including an OR mapping unit, a schema generator, a schema reverse engineering unit and applications. The ORM specification is based on the ORM grammar and includes information for defining the mapping between object-oriented system and the relational system. The Object Class Definitions define the object-oriented system, and the relational database defines the relational system. The Database Exchange Unit executes in accordance with the ORM specification, and is the programs/routines that operate to translate data from the object model to the relational model, and vice versa. The present invention further comprises a number of methods including: a method for generating a ORM Data Structures; a method for generating a mapping unit; a method for generating a schema from an object model and an object-relational mapping specification; a method for generating an Object Class Definitions and an ORM specification from an ORM template specification and database schema; and a method for object streaming, and methods for efficient generation of persistently unique sequence numbers for new objects.

42 Claims, 26 Drawing Sheets

Microfiche Appendix Included
(1 Microfiche, 30 Pages)

Method for using ORM specification based on an existing ORMid or an ORMfile to create an ORM Data Structure Method For Generating ORM Data Structures from an ORM Specification and Object Class Definitions Method for generating relational schema from an ORM specification and Object Class Definitions Method for generation of an ORM Specification and an Object Class Definition from a database schema Method for responding to an object
call (query or insert)

Method for Object Streaming

Method for Using Directed Operations for a Query Operation

```
<ORM-INFO>              ::= [;ORMId=<ORMId>] [;ORMFile=<fileName>]

<DATABASE-URL>          ::= <regularURL>[<ORM-INFO>]

<ENDDATABASE-SPEC>      ::= ;

<DATABASE-SPEC>         ::= DATABASE <DATABASE-URL>
                                <ENDDATABASE-SPEC>

<PRIMARY-KEY-SPEC>      ::= PRIMARY_KEY {<attribName> ...}

<REFERENCE-KEY-SPEC>    ::= REFERENCE_KEY <referenceKeyName>
                                {<attribName> ...}

<SQLMAP-SPEC>           ::= SQLMAP FOR <attribName>
                                [COLUMN_NAME <columnName>]
                                [SQLTYPE <sqlType>]
                                [NULLABLE]

<RELATIONSHIP-SPEC>     ::= RELATIONSHIP <attribName> REFERENCES <targetClassName>
                                {EMBEDDED | [BYVALUE] [REFERENCED_KEY
                                <referencedKeyName>] WITH <attribName> ...}

<ENDCLASS-SPEC>         ::= ;

<CLASS-SPEC>            ::= CLASS <className> [TABLE <tableName>]
                                <PRIMARY-KEY-SPEC>
                                [<REFERENCE-KEY-SPEC> ...]
                                [<SQLMAP> ...]
                                [<RELATIONSHIP-SPEC> ...]
                                <ENDCLASS-SPEC>

<ORDERBY-SPEC>          ::= ORDERBY {<attribName> ...}

<COLLECTION-CLASS-SPEC> ::= COLLECTION_CLASS <className>
                                COLLECTION_TYPE {ARRAY | VECTOR}
                                ELEMENT_CLASS <elelemtClassName>
                                [ELEMENT_TABLE <elementTableName>]
                                <PRIMARY-KEY-SPEC>
                                [<ORDERBY-SPEC>]
                                <ENDCLASS-SPEC>

<SEQUENCE-SPEC>         ::= SEQUENCE <sequenceName>
                                MAX_INCREMENT <maxIncrementValue>
                                [START_WITH <startingVal>]

<ORM-SPEC>              ::= <DATABASE-SPEC>
                            Any combination of <CLASS-SPEC>,
                                <COLLECTION-CLASS-SPEC>,
                                <SEQUENCE-SPEC> and <REMARK-SPEC>
```

FIGURE 17
ORM Grammar

```
DATABASE jdbc:odbc:sqlpubs;user=guest;password=hello;ORMId=pubs01
;
REM
CLASS RoySched TABLE roysched
PRIMARY_KEY title_id lorange
;
COLLECTION_CLASS ArrayRoySched COLLECTION_TYPE ARRAY
    ELEMENT_CLASS RoySched
PRIMARY_KEY title_id
ORDERBY royalty
;
CLASS Title TABLE titles
PRIMARY_KEY title_id
RELATIONSHIP royscheds REFERENCES ArrayRoySched BYVALUE WITH
    title_id
SQLMAP FOR price SQLTYPE Money
;
COLLECTION_CLASS ArrayTitle COLLECTION_TYPE ARRAY ELEMENT_CLASS
    Title
PRIMARY_KEY pub_id
ORDERBY ytd_sales title_id
;
CLASS PubInfo TABLE pub_info
PRIMARY_KEY pub_id
SQLMAP FOR logo SQLTYPE image
SQLMAP FOR prInfo COLUMN_NAME pr_info SQLTYPE text
;
CLASS Publisher TABLE publishers
PRIMARY_KEY pub_id
RELATIONSHIP pubInfo REFERENCES PubInfo BYVALUE  WITH pub_id
RELATIONSHIP titles REFERENCES ArrayTitle BYVALUE WITH pub_id
;
CLASS Job TABLE jobs
PRIMARY_KEY job_id
;
CLASS Emp TABLE employee
PRIMARY_KEY emp_id
RELATIONSHIP job REFERENCES Job REFERENCED_KEY PrimaryKey WITH
    job_id
RELATIONSHIP publisher REFERENCES Publisher WITH pub_id
;
CLASS TitlePub
PRIMARY_KEY title_id
;
CLASS LinkList TABLE linklist
PRIMARY_KEY link_id
RELATIONSHIP next REFERENCES LinkList BYVALUE WITH next_link_id
;
```

FIGURE 18

ORM Specification

ORM Spec Graphical rep

Java application   Java object-relational
(Thick client)   mapping hand coding Java application   Java object-relational
(Thin client)   mapping middleware Method for Generating and using Named Sequence Generators

SYSTEM AND METHOD FOR EXCHANGING DATA AND COMMANDS BETWEEN AN OBJECT ORIENTED SYSTEM AND RELATIONAL SYSTEM

This application contains a Microfiche Appendix consisting of one (1) slide and 30 frames.

BACKGROUND OF THE INVENTION

1. Field of the Invention

The present invention relates generally to systems and methods for transferring data and commands between computing systems. In particular, the present invention relates to a system and a method for exchanging data and commands between an object oriented system and a relational system.

2. Description of the Background Art

With the development and proliferation of computers of increasing performance capability, a number of different languages and programming paradigms have been developed. These languages and programming paradigms are used in conjunction with data that can be stored persistently in a variety of different ways. For example, options for persistent storage include relational databases, file systems and object-oriented databases.

Most data has been stored in a relational format such as in tables of a relational database. The data is manipulated and maintained by a relational database management system (RDBMS). One particularly attractive attribute of such relational systems is that RDBMSs are able to persistently store data. Relational systems are persistent in the sense that the data is stored in a stable storage environment such that the data is accessible even after the application that created the original data stops executing. Furthermore, there are a number of applications and tools available for the manipulation and maintenance of such data in relational databases. Since relational databases have been in existence for many years, the use and proliferation of such applications and tools are widespread, and sophistication and capabilities of the tools are great.

However, a new programming paradigm that has become more widespread in recent years is object-oriented programming (OOP). In fact, OOP is becoming the dominant programming paradigm with the development and widespread use of new programming languages such as JAVA and C++. In OOP, a class is used to encapsulate the structure and behavior of objects. Thus, the objects contain both the data and the functionality for manipulation of the data.

It is very natural and desirable for application developers to represent the business objects in an object-oriented language like Java and at the same time use RDBMS for the persistence storage of those objects.

One problem existing in the art is that there are no systems and methods to bridge the gap between the programming paradigm used for object-oriented systems and the programming paradigm used for relational systems. There are also no systems and methods for bridging the gap between the languages used for object-oriented systems such as Java and the languages used in relational systems such as SQL. Furthermore, there is no easy method for specifying the mapping between such object-oriented systems and relational systems. Thus, to perform translation between these systems has required hand coding of the mapping between object-oriented systems and relational systems, and hand coding is tedious, time-consuming, error-prone and tends to be non-uniform. Therefore, there is a need for systems and method for automatically translating and exchanging data between object-oriented systems and relational systems.

The prior art has attempted to solve the problem with graphical user interfaces that define mappings and by producing proprietary platform specific code that will translate between object-oriented systems and relational systems. However, such prior art systems have the following shortcomings. First, they are not always able to create a relational schema given an object model. Second, they are not always able to produce an object model given a relational schema. Third, they do not provide a uniform method for specifying directed options for object graph specification for different operations. Fourth, the prior art is not able to handle large sets of queried objects by streaming them between different tiers of applications. Thus, they are subject to memory bandwidth and response-time performance problems. Finally, such existing systems are coded for operation with a particular RDBMS. Thus, they are not interoperable among different relational back ends.

In object-oriented systems, when a new object is created it is typically assigned an identification number that can identify it uniquely among other objects of the same type. If objects are stored persistently in a database, the identification number assigned to a newly created object in memory should be unique with respect to even the already stored objects in the database. So there is a need for a system and method having the ability to always provide a unique number. The existing art has attempted to solve the problem of providing unique identification numbers by providing the notion of a unique row-id in the RDBMS, thereby assigning a newly inserted row a unique number. However, the prior art approach has a number of disadvantages. First, the unique id is not known to the program until the object is inserted in the database. So if the programmer has to create related objects which need to know the unique ids for their initialization, the current scheme would require an insert operation and then a query operation to get the RDBMS assigned unique id. This is inefficient and cumbersome. Second, not all RDBMSs have the feature of unique row-ids, thus, such systems in the prior art cannot generate unique ids. Third, each RDBMS specifies its own unique way of defining and retrieving these row ids. So the application programmer cannot use a consistent and portable way of defining, using and referring to the unique ids.

Therefore, because of the advantages offered by OOP and the persistence of data offered by relational systems there is a need for a system that can easily be configured and that can reliably and automatically transfer data between such relational systems and object-oriented systems.

SUMMARY OF THE INVENTION

The present invention overcomes the deficiencies and limitations of the prior art with a system and methods for exchanging data and commands between an object oriented system and a relational system. In particular, the system of the present invention comprises an Object-Relational Mapping (ORM) grammar, an ORM specification, Object Class Definitions, a relational database, an operating system, a Database Exchange Unit including an OR mapping unit, a schema generator, a schema reverse engineering unit and applications. The ORM specification is based on the ORM grammar and includes information for defining the mapping between the object-oriented system and the relational system. The Object Class Definitions define the object-oriented system, and the relational database defines the relational system. The Database Exchange Unit executes in accordance with the ORM specification, and is the programs/ routines that operate to translate data from the object model to the relational model, and vice versa. The schema reverse engineering unit creates Object Class Definitions and an ORM specification from an ORM template specification and database schema. The schema generator generates the RDBMS schema from Object Class Definitions and the ORM specification. The system and method of the present invention are particularly advantageous due to an innovative grammar used to define the mapping between an object-oriented system and a relational system. The specification of mapping information using this innovative grammar allows the mapping information to be stored conveniently and easily in an operating system file and also as part of the relational database. The present invention also provides an application programming interface (API) that automates the tedious object-oriented program translation code between the relational system and the object oriented system. Furthermore, the system and methods of the present invention include units to provide for the automatic, sequenced number generation for new objects. This is advantageous because it provides user flexibility in naming object identifiers for persistent storage in the database while ensuring that the object identifiers are unique.

The present invention further comprises a number of methods including: a method for generating a ORM Data Structure; a method for generating a mapping unit; a method for generating a schema from an object model and an object-relational mapping specification; a method for generating Object Class Definitions and an ORM specification from an ORM template specification and database schema; and a method for object streaming.

BRIEF DESCRIPTION OF THE DRAWINGS

FIG. 17 is the specification of an exemplary ORM grammar used in the present invention.

FIG. 18 is a textual representation of an exemplary ORM specification;

DETAILED DESCRIPTION OF THE PREFERRED EMBODIMENTS

Figure 1:
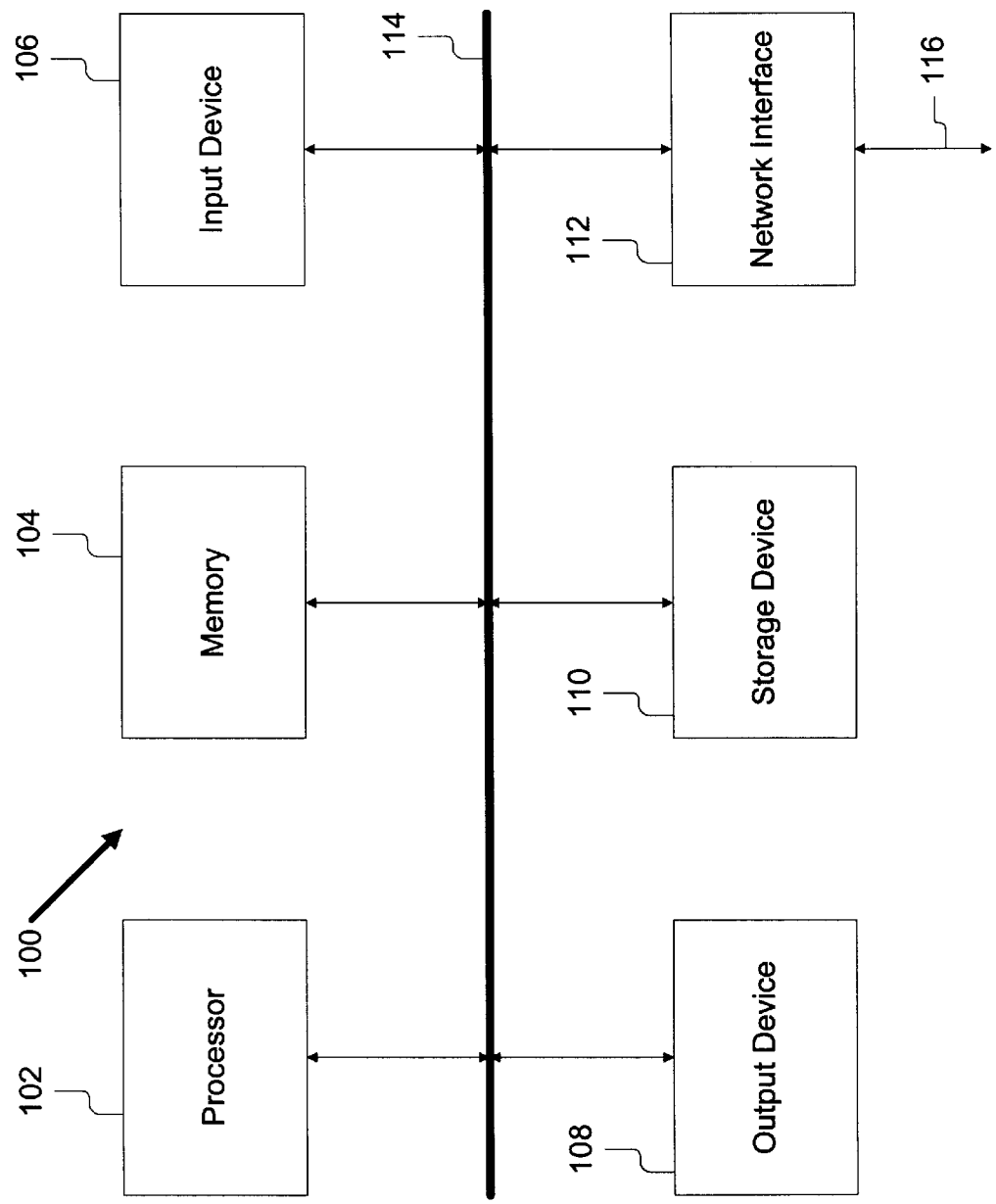
FIG. 1 is a block diagram of a first and preferred embodiment for a system constructed according to a preferred embodiment of the present invention for object-relational mapping.

Referring now to FIG. 1, a block diagram of a preferred embodiment of an object-relational mapping system 100 constructed in accordance with the present invention is shown. The object-relational mapping system 100 preferably comprises a central processing unit or processor 102 that connects with a memory 104, an input device 106, an output or display device 108, a data storage device 110, and a network interface 112. The processor 102, memory 104, input device 106, output device 108, storage device 110, and network interface 112 are preferably coupled in a von Neuman architecture via a bus 114 such as a personal or mini computer. The processor 102 is preferably a microprocessor such as a Sun Sparc, PowerPC or an Intel Pentium; the output device 108 is preferably a video monitor; and the input device 106 is preferably a keyboard and mouse-type controller. The memory 104 is preferably random access memory (RAM) and read-only memory (ROM). The processor 102 is also coupled to the network interface 112 in a conventional manner for connection to a network via line 116 and other computers such as via a local area network, wide area network or the Internet. In an exemplary embodiment, the object-relational mapping system 100 operates on an IBM-type personal computer. Those skilled in the art will realize that the object-relational mapping system 100 could also be implemented as any one of a variety of other computers such as those made by Apple, Sun, Digital Equipment Corporation or IBM.

The object-relational mapping system 100 of the present invention provides for the automatic and systematic exchange of data and commands between an object-oriented system and a relational system. The processor 102, under the guidance of instructions received from the memory 104 and from the user through the input device 106, provides signals for the exchange of data and commands between an object-oriented system and a relational system. The memory 104 preferably includes an ORM Grammar 200, an ORM Specification 202, Object Class Definitions 204, a relational database management system (RDBMS) 206, an operating system 208, a Database Exchange Unit 210, a schema generator 212, RDBMS tables and ORMMetadata Tables 214, applications 216, a GUI or text editor 218, a schema reverse-engineering unit 220, an ORM template specification 222, a Metadata ORM specification 224, and Named Sequence Generators 226. The operation interaction of the above modules of the present invention provides for the automatic, systematic exchange of data between an object-oriented system and a relational system. In particular, the present invention with the above modules allows for: 1) the generation of modules (ORM Data Structure) for translation of data from an objectoriented system to a relational system based on an ORM specification; 2) the generation of an ORM specification and an Object Class Definitions from a database schema; 3) the generation of a relational schema from an ORM Specification and Object Class Definitions; and 4) the transfer of data between the object-oriented system and the relational system. Those skilled in the art will realize that various equivalent combinations of devices can achieve the same results when used in accordance with the present invention. For example, while the memory blocks 200, 202, 204, 206, 208, 210, 212, 214, 216, 218, 220, 222, 224 and 226 are shown as separate, units and coupled to each other and other components by the bus 114, they can easily comprise different regions of a contiguous space in memory. While the memory blocks 200, 202, 204, 206, 208, 210, 212, 214, 216, 218, 220, 222, 224 and 226 will now be described as routines or modules, and therefore primarily defined by their functionality, those skilled in the art will recognize that the particular modules or portions could be implemented in hardware as an alternate embodiment.

The system and methods of the present invention are particularly advantageous because of the use of an innovative ORM Grammar 200 to define the mapping between an object-oriented system and a relational system. Such an exemplary grammar is shown in FIG. 17. Furthermore, Appendix A provides more detail on the ORM Grammar 200 including the syntax, an explanation and an example. The ORM Grammar 200 the rules for textually describing an Object-Relational Mapping (ORM) in a declarative way. The specification of mapping information using this innovative Grammar 200 allows the mapping information to be stored conveniently and easily in an operating system file and also as part of the relational database, as will be discussed in more detail below with reference to FIG. 10. This ORM Grammar 200 is shown in detail in FIG. 17. While the ORM Grammar 200 is shown as being stored in memory, the ORM Grammar 200 may in alternate embodiments be used to generate and interpret an ORM Specification 202 without being stored in memory 104. The ORM Grammar 200 of the present invention is particularly advantageous because it provides an extensible textual system in which it is very easy for the user to add new constructs for specifying mappings between the relational model and the object model. For example, one can easily add new rules to define mappings other that those provided in FIG. 17. Such examples for extending the ORM Grammar 200, descriptions of their functionality and the API are provided in Appendix D.

Figure 2:
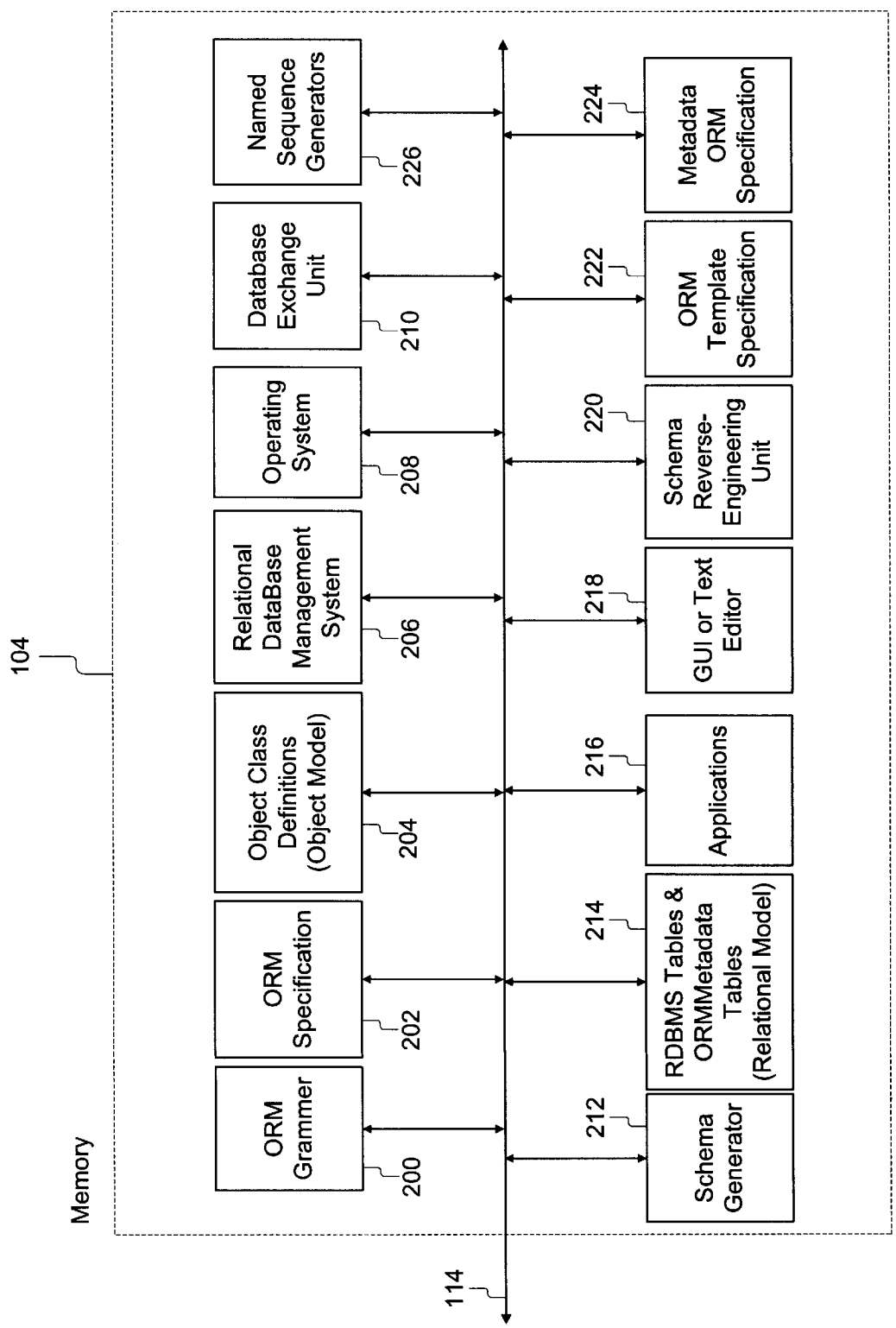
FIG. 2 is a block diagram of a first and preferred embodiment of a memory used in the system of FIG. 1, and including the present invention.

Referring again to FIG. 2, the memory 104 is shown as including an ORM Specification 202. An ORM Specification 202 is a textual specification of an instance of object-relational mapping information based on the ORM Grammar 200. In other words, the ORM Specification 202 defines how data is mapped from the object-oriented system to the relational system and vice versa. The present invention is particularly advantageous because of the use and structure of the ORM Specification 202. More specifically, the ORM Specification 202 is preferably a text file or ORM file, and specifies the mapping using the ORM Grammar 200 discussed above and shown in FIG. 17. In the preferred embodiment, the ORM Specification 202 can be indexed or referred to by using an ORMID. Since the ORM Specification 202 is described textually, it can be stored easily in memory 104, a storage device 110 or even as part of a relational database. Furthermore, because the ORM Specification 202 is described textually there is no special software required to create, view and edit the ORM Specification 202. Any one of a variety of text editor or graphical user interfaces can be used to create, modify and review ORM Specifications 202. One such exemplary ORM Specification 202 is shown in FIG. 18.

Figure 19:
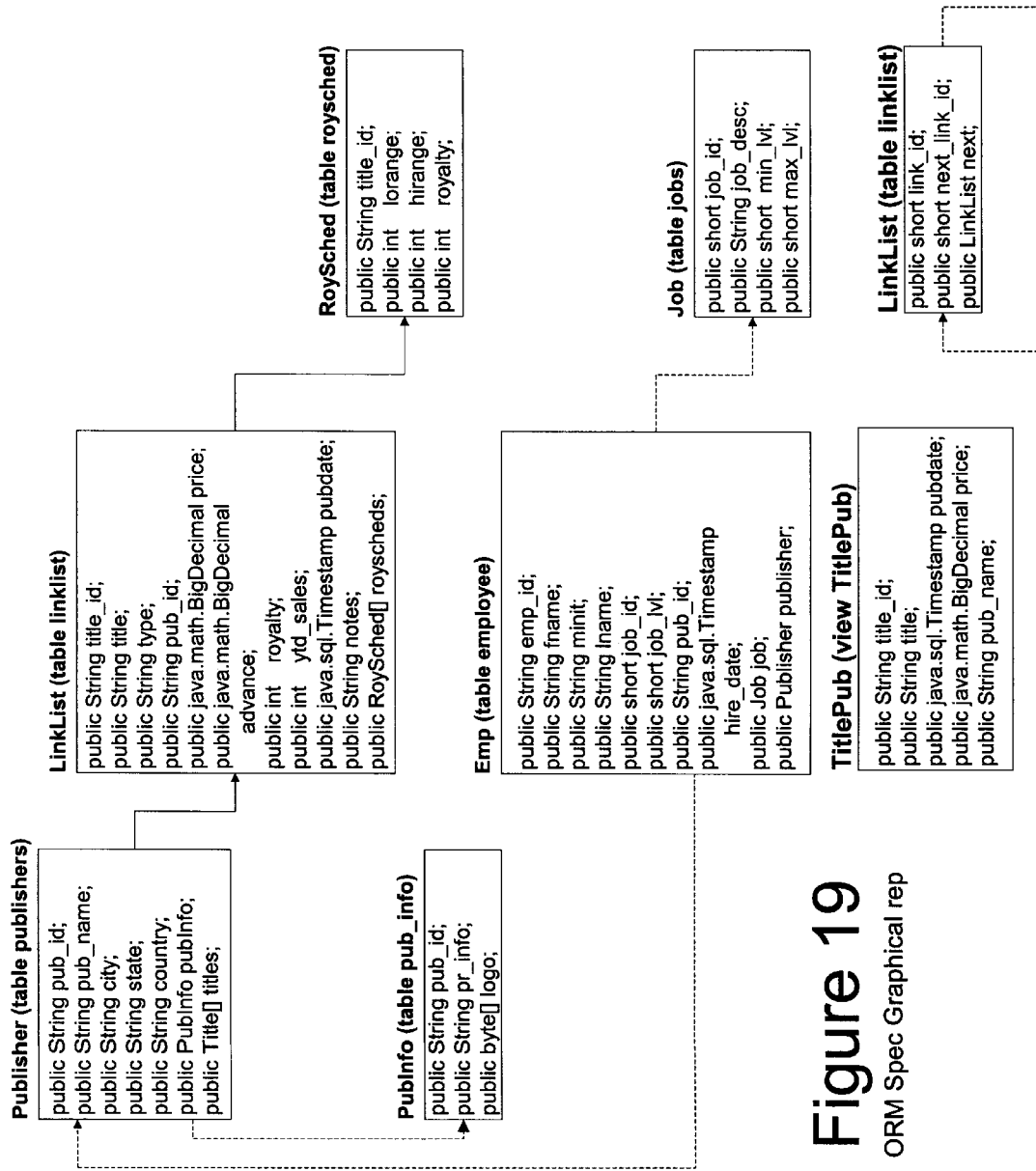
FIG. 19 is a graphical representation of the exemplary ORM specification of FIG. 17 showing the mappings between the object model and the relational model that will be performed by a database exchange using the exemplary ORM specification.

The memory 104 also includes Object Class Definitions 204 that define an object model. Object Class Definitions 204 describe an object model in an object-oriented language such as Java. The Object Class Definitions 204 describe the object model in a conventional manner such that objects are instances of classes. The Object Class Definitions 204 essentially define the object-oriented system and formatting for data that is transferred from or to the object-oriented system. One such exemplary set of Object Class Definitions 204 is graphically depicted in FIG. 19, and the concept typical of such object models are described for the particular example in Appendix B.

Also included in the memory 104 is a relational database management system (RDBMS) 206. The RDBMS 206 may be any one of a conventional type such as Oracle, Sybase, Informix, Microsoft SQL server, and IBM DB2. The RDBMS 206 preferably includes routines and modules for storing, retrieving and editing data maintained in a relational system such as may be present on the storage device 110 or distributed over the network and accessible via the network interface 112.

The memory 104 also includes one or more operating systems 208. The operating system is preferably a conventional personal computer operating system such as UNIX, or DOS and Windows sold by Microsoft Corporation. Alternatively, the present invention could use other conventional operating systems such as OS/2 or System 8.0 for the Macintosh by Apple Computer.

A Database Exchange Unit 210 is also included in the memory 104. The Database Exchange Unit 210 is the routine or module that controls the processor 102 to perform the actual exchange of data from the relational system to the object-oriented system. At the highest level, it includes programs and routines that operate to translate data from the object model to the relational model and vice versa. The Database Exchange Unit 210 is initialized using an ORM Data Structure Creation Unit 302 as will be described in more detail below, and once initialized, operates independently using the OR Mapping Unit 304 to perform data and command translation.

The Schema Generator 212 is also stored in memory 104. The Schema Generator 212 is a tool or routines for controlling the processor 102 to generate the relational database schema (table definitions, constraint definitions) as well as metadata information corresponding to the Object Class Definitions 204 and the ORM Data Structures 308 during initialization. After the relational database schema have been created, they are stored in memory 104 or the RDBMS 206 and used by OR Mapping Unit 304 to map object calls to database requests. The Schema Generator 212 (e. g., JDX-Schema in Java) is preferably invoked with the command:

java JDXSchema[–metaCreate|–metaInit| – init](ORMFile)

This Schema Generator 212 takes the name of the file (e. g., abcjdx) containing the Object-Relational Mapping information as input, and generates three script files containing the SQL DDL statements for creating the required tables and their primary keys (abcjdx.create); foreign key constraints (abc.jdx.alter); and dropping those constraints and tables (abcjdx.drop). Before using the database 206 for Object-Relational Mapping (for the very first time), the flag-metaCreate is used. This causes the ORMMetadata Tables 214 to be created in the database 206. These ORMMetadata Tables 214 are subsequently used to store the Object-Relational Mapping information. By using the flag-metainit one can store just the Object-Relational Mapping information (metadata) in the database 206 corresponding to a given ORMID. This is useful when the database tables for user objects do not need to be (re-) created. By using the flag-init, the above scripts are automatically executed against the database 206 such that the user can start creating and using persistent user objects against the database in Java programs. The flag-init also stores the Object-Relational Mapping information (metadata) in the database 206 corresponding to the given ORMID in <ORMFile>. Only one of the three options (metaCreate, metaInit, init) may be specified.

The memory 104 also includes RDBMS Tables and ORMMetadata Tables 214. The RDBMS Tables 214 basically define the relational model just as the Object Class Definitions 204 define the object model. In other words, the RDBMS Tables 214 set forth the organization and structure of the data in the relational model in addition to describing certain functionality provided by the relational model. The RDBMS Tables 214 hold persistent data for the objects which are instances of the Object Class Definitions 204.

The present invention also stores multiple ORM Specifications 202 in the ORMMetadata Tables 214 that are part of the database 206. The ORMMetadata Tables 214 hold persistent data for the ORM Specification 202 and Named Sequence Generator 226. Most modern RDBMSs support a data type of LONGVARCHAR (e.g., 'text' in Sybase RDBMS) which can accommodate large textual data. Having a database table ORMMetadata 214 with the following structure provides a convenient way to store the Object-Relational Mapping information. For example, the command CREATE TABLE ORMMetadata (ORMId varchar(80), MetaInfo LONGVARCHAR, MetaFileName varchar(80) CONSTRAINT PK_ORMMetadata PRIMARY KEY (ORMId));

can be used to store the ORM Specification 202 in the database 206, where the ORMId (defined below with reference to FIG. 10) identifies the specification uniquely. The text of the ORM File goes into the MetaInfo field, and the MetaFileName field is initialized with the ORM File name for recording purpose. Even if the RDBMS 206 does not support a LONGVARCHAR style field, it is easy to store the MetaInfo text in multiple rows of a separate table with a varchar (255) field and an ORMId field. The ORMId field has the same value for all the records holding chunks of MetaInfo for a particular ORMId. A time stamp field is preferably added to the ORMMetadata Tables 214 to keep track of when the particular mapping information was created. A version field that identifies the version of the grammar describing the Object-Relational Mapping information stored in MetaInfo field is also included in the ORMMetadata Tables 214. The version information is employed to correct the interpreter for the specification because the ORM Grammar 200 of the specification may change to accommodate new functionality.

Thus, the ORMMetadata Table 214 provides a very convenient facility to store multiple Object-Relational Mapping information, each identifiable uniquely through ORMIds. It also provides an elegant way of partitioning the object view of the underlying relational data. The ORM-Metadata Tables 214 also include a table for storing sequence number information as will be described below with reference to the Named Sequence Generators 226.

The memory 104 also includes applications 216 and a text editor or graphical user interface 218. The applications 216 may be any one of a conventional type written in object-oriented languages such as Java. The applications 216 are routines or modules that allow the user to access data in the system 100. Also included in memory 104 is a conventional text editor or graphical user interface 218. The text editor or graphical user interface 218 may be any one of a number of conventional editing interfaces. As noted above, since the ORM Specification 202 is a text file, any type of text editors or graphical user interfaces 218 may be included in the system 100, and thereby be used to change the ORM Specification 202 and thus how data and commands are exchanged between the relational system and the object-oriented system.

The memory 104 also includes a Schema Reverse Engineering Unit 220. The Schema Reverse Engineering Unit 220 is a routine or tool for creating Object Class Definitions 204 and ORM Specification 202 using a database schema (table definitions, constraint definitions) for a set of tables. The Schema Reverse Engineering Unit 220 provides the user, given a relational model, with the ability to generate the ORM Specification 202 for translating between the given relational model and an object-oriented model. The Schema Reverse Engineering Unit 220 also generates or defines the object-oriented model by creating the Object Class Definitions 204. The operation of the tools forming the Schema Reverse Engineering Unit 220 will be described in more detail below with reference to FIG. 13.

Also included in the memory 104 is an ORM Template Specification 222. The ORM Template Specification 222 is a module that is used in conjunction with the Schema Reverse Engineering Unit 220. The ORM Template Specification 222 provides data that along with information about the relational model is used by the Schema Reverse Engineering Unit 220 to produce the Object Class Definitions 204 and the ORM Specification 202. The ORM Template Specification 222 is a simplified ORM Specification 202 including the names of the tables to be considered for generating Object Class Definitions 204. The metadata information about named tables in the RDBMS 206 is used to create Object Class Definitions 204.

The memory 104 further includes a Metadata ORM Specification 224. The Metadata ORM Specification 224 is a specification like the ORM Specification 202 that can be used to generate data structures for the object relational mapping. In particular, the Metadata ORM Specification 224 is preferably a predefined ORM Specification describing the object-relational mapping between metadata objects and ORMMetadata Tables 214 which store information about ORM Specification 202 and Named Sequence Generators 226.

Finally, the memory 104 includes Named Sequence Generators 226. Named Sequence Generators 226 are routines or modules that generate persistently unique sequence numbers. These unique sequence numbers are used in turn by the applications 216 to store unique objects in a database 206. Since the numbers are persistently unique, this ensures that old or existing objects will have different identification numbers. In the present invention, there is a unique declarative method for specifying named sequences, and the Named Sequence Generators 226 manage and control the use and creation of sequence numbers to ensure that there are no conflicts with existing sequence or identification number for objects, even among different applications. The present invention is advantageous because like the Grammar 200, the Named Sequence Generators 226 provide a declarative way of defining named sequences that can be used to generate persistently unique sequence numbers in an efficient way. These sequence numbers, among other things, can be used to assign unique ids to different objects. The Named Sequence Generators 226 of the present invention are particularly advantageous for a number of reasons. First, the grammar for specifying sequence generators is simple and intuitive. Second, the declarative way of specifying the sequences is a compatible and convenient way of defining sequences along with Object Relational Mapping information. Third, the way sequences are named by the Named Sequence Generators 226 is done in a manner convenient for application programmers because it uses meaningful names (e. g., imageIdSequences) for the sequence generators, and allows the creation of multiple sequence number domains (e. g., partIdSequences, customerIdSequences, etc.). Fourth, the Named Sequence Generators 226 allow the user to specify a starting value for a sequence generator. This is very advantageous because for already existing data with a home-grown way of generating sequence numbers, the new method may be employed with a starting value of 1 more than the maximum value in the current set of data; and from problem domain or business needs a starting value other than 1 may be more appropriate such as when a new company starts its invoice numbers from 1001 or when 4 billion starts are already identified and documented and a new application for creating entries for new starts may use a sequence generator with a starting value of 4 billion and 1. Finally, the declaration of a sequence is database independent, and the sequence generator implementation mechanism can work with any backend relational database.

Also included with the Named Sequence Generators 226 are routines, specifically, an API (getNextSequence) to get the next set of persistence sequence numbers. The feature of specifying an increment in the API call of getNextSequence enables an efficient generation of sequence numbers without requiring a database call for every new sequence number. The calling application can safely assume that no other application would get the next sequence number in the range of the returned sequence number n to n+increment-1 (both inclusive). The method for servicing the API is described below in more detail with reference to FIG. 22.

Figure 3:
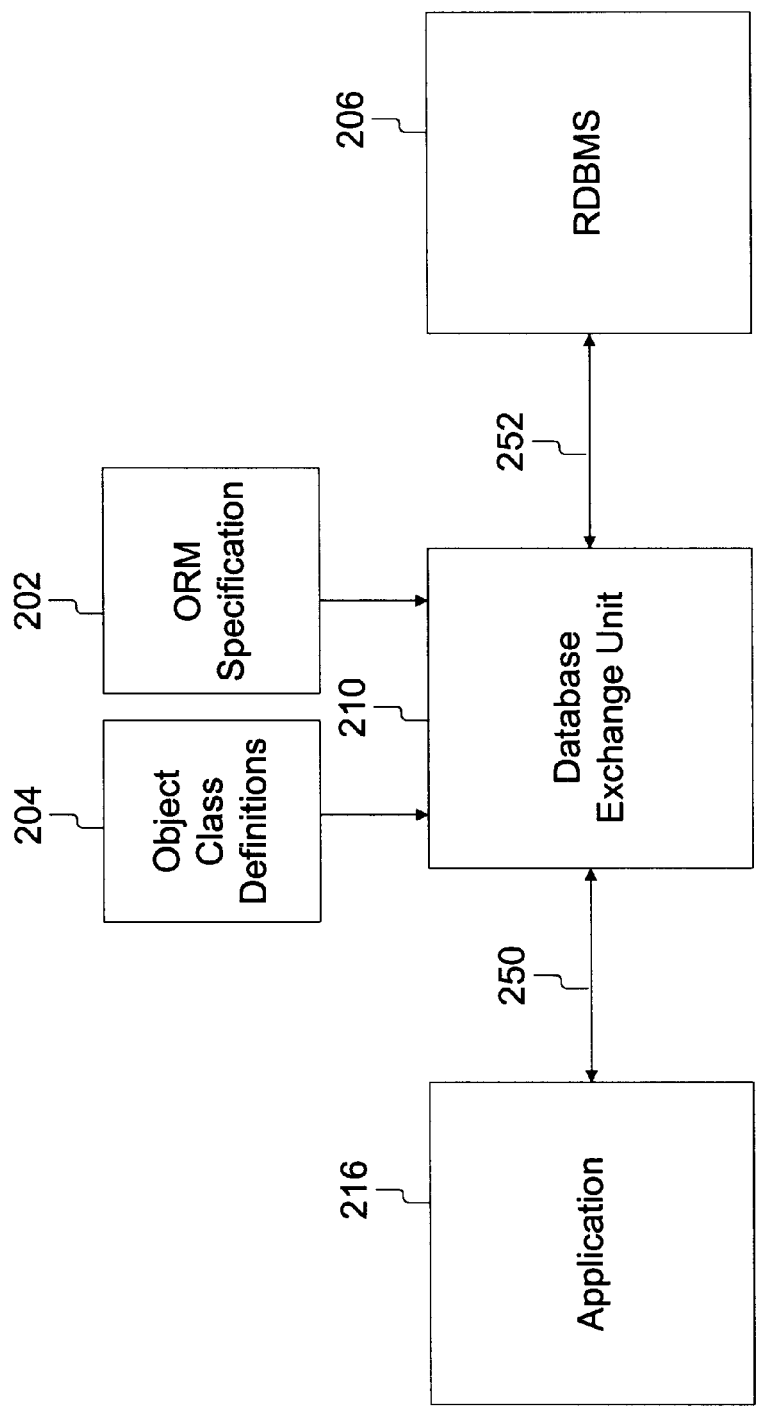
FIG. 3 is a block diagram of a second embodiment of the system of the present invention illustrating the present invention implemented as modules.

Referring now to FIG. 3, the present invention is best shown as being the coupling element between a relational system and an object-oriented system. In normal operation, the Database Exchange Unit 210 controls the transfer of data and commands between an application 216 (object-oriented system) and the RDBMS 206 (relational system). The Database Exchange Unit 210 is coupled to receive and send data and commands to and from the application 216 using conventional object-oriented techniques, such as constructs provided by an OOP language such as Java. The Database Exchange Unit 210 formats and structures the data and commands into and from a format suitable for an object-oriented system. Similarly, the Database Exchange Unit 210 is coupled to the RDBMS 206 to receive and send data and commands to and from the RDBMS 206 in a format suitable for relational systems. More particularly, the Database Exchange Unit 210 generates queries, inserts, updates and deletions, to fetch or modify the data in the RDBMS 206 based on the object calls received from the application 216. The Database Exchange Unit 210 is also coupled to the Object Class Definitions 204 and the ORM Specification 202. The Database Exchange Unit 210 interacts with the Object Class Definitions 204 during both initialization and normal operation to perform the exchange of data and commands between the application 216 and the RDBMS 206. The Database Exchange Unit 210 is also coupled to the ORM Specification 202, but only interacts with the ORM Specification 202 as will be described in more detail below with reference to FIG. 5 and FIG. 11.

Figure 4:
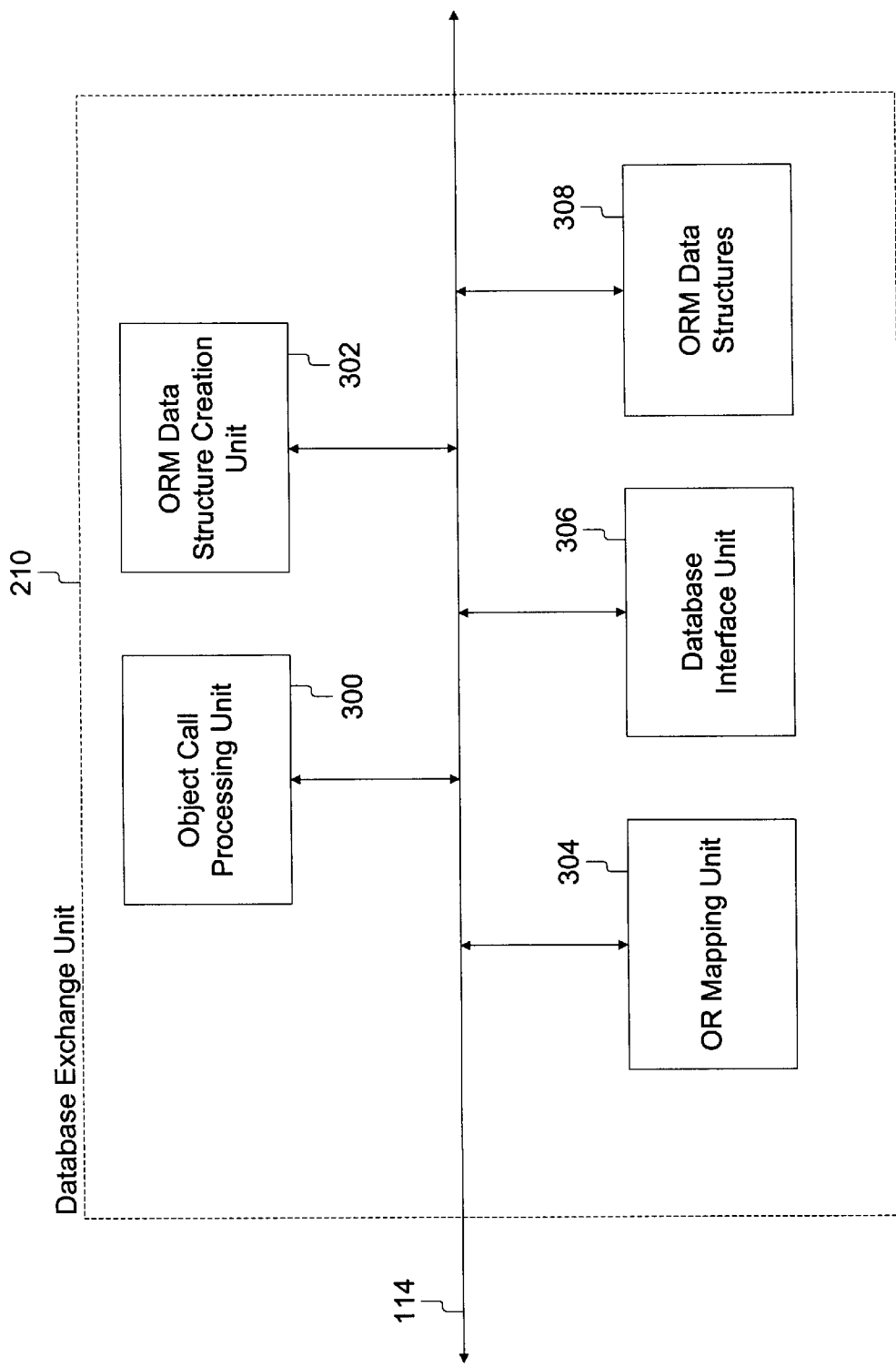
FIG. 4 is a block diagram of a first embodiment of a Database Exchange Unit of FIG. 2 as routines stored in the memory of the system.

Referring now to FIG. 4, the Database Exchange Unit 210 is shown in more detail. The Database Exchange Unit 210 preferably comprises an Object Call Processing Unit 300, an ORM Data Structure Creation Unit 302, an OR, Mapping Unit 304, a Database Interface Unit 306, and an ORM Data Structures 308. Each unit 300, 302, 304, 306 and 308 is preferably a routine or module stored in a block of memory 104 for controlling the processor 102 to perform the operations as will be described below. The units 300, 302, 304, 306 and 308 are coupled by bus 114 as shown, and their operation, exchange of data and functionality will be described below with reference to FIG. 5. Those skilled in the art will recognize that while the memory blocks are shown as separate 300, 302, 304, 306 and 308, and coupled to each other and other components by the bus 114, they can easily comprise different regions of a contiguous space in memory 104.

Figure 5:
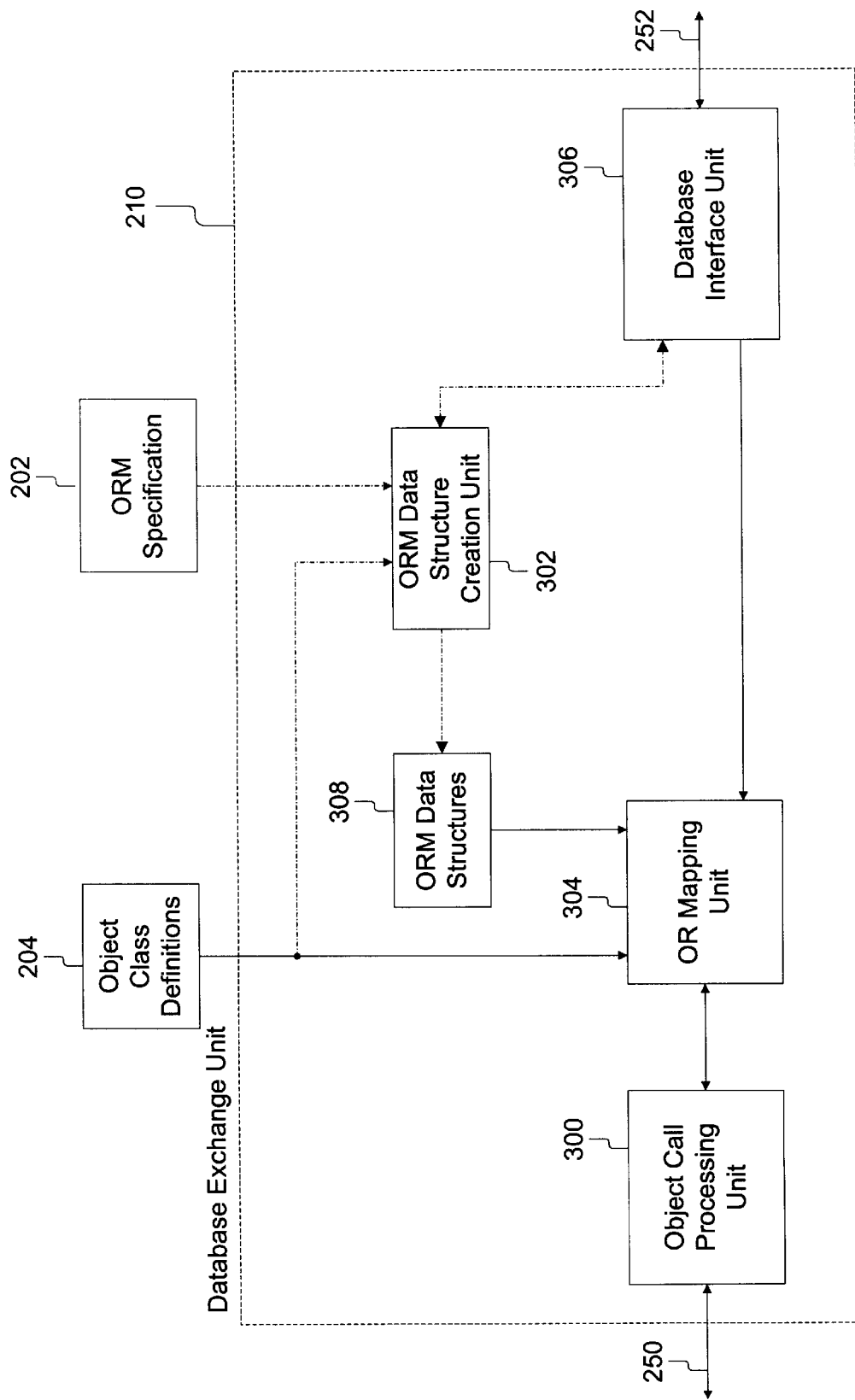
FIG. 5 is a block diagram of a second embodiment of the Database Exchange Unit constructed as modules.

The operation of the Database Exchange Unit 210 and its components is best shown in FIG. 5. FIG. 5 is a block diagram of Database Exchange Unit 210 constructed as modules and showing the coupling utilized by their functionality. In FIG. 5, the couplings used for the transfer of data for initialization and the creation of the ORM Data Structures 308 are shown by dashed lines for ease of understanding. As noted above, the Database Exchange Unit 210 is delineated in FIG. 5 by a dashed block and comprises an Object Call Processing Unit 300, an ORM Data Structure Creation Unit 302, an OR Mapping Unit 304, a Database Interface Unit 306, and an ORM Data Structures 308. The Object Class Definitions 204 and the ORM Specification 202 are stored in another portion of memory as has been described above with reference to FIG. 2.

The ORM Data Structures 308 are in-memory data structures built from the ORM Specification 202 and Object Class Definitions 204. The ORM Data Structures 308 are used in the translating of object calls to relational data and commands. More specifically, the ORM Data Structures 308 preferably include the following data structures to store various information about the object-relational mapping:

| Data Structure | Description |
| --- | --- |
| ColumnInfo | Stores the relational Column information - name, SQL type etc. |
| TableInfo | Stores the tableName, the list of ColumnInfo corresponding to its columns etc. |
| AttribInfo | Stores the following information about a class attribute: name, type, ColumnInfo etc. |
| ComplexAttribInfo | In addition to AttribInfo information, it also stores the information about the referenced object (or collection), the referencing attributes, the containment of the referenced object etc. |
| ReferenceKeyInfo | Stores information about the primary and reference keys of a class. |
| ClassInfo | Stores the className, reference to TableInfo, list of AttribInfo, list of ComplexAttribInfo, etc. |
| CollectionClasssInfo | In addition to ClassInfo information for its element class, it also stores the information about collection type, containment type and order by attributes, etc. |
| DatabaseInfo | Stores url, ORMId, list of ClassInfo, list of TableInfo, list of database connections, etc. |

The ORM Data Structure Creation Unit 302 is preferably coupled to the Object Class Definitions 204 and the ORM Specification 202 to receive the object model and the mapping between the relational system and the object-oriented system, respectively. The ORM Data Structure Creation Unit 302 is also coupled to the Database Interface Unit 306 for accessing the RDBMS 206 to receive schema that describe how the relational system organizes data. Using this information, the ORM Data Structure Creation Unit 302 generates the ORM Data Structures 308. The ORM Data Structure Creation Unit 302 is preferably routines or tools to generate the ORM Data Structures 308 using an ORM Specification 202 (coming from either an ORM file or MetaInfo in the ORMMetadata Tables 214) and Object Class Definitions 204. In one embodiment, the ORM Data Structure Creation Unit 302 parses the ORM Specification 202 as per the ORM Grammar 200 specified and builds the ORM Data Structures 308. Each construct of the ORM Grammar 200 is used to create the data structures. For example, each <CLASS-SPEC> creates an instance of ClassInfo. Each <COLLECTION-CLASS-SPEC> creates an instance of CollectionClassInfo. The reflection facility of the language may be used to create the instances of AttribInfo. <PRIMARY-KEY-SPEC> and <REFERENCE-KEY-SPEC> are used to create instances of ReferenceKeyInfo. <RELATIONSHIP-SPEC> is used to create the instances of <ComplexAttribInfo>. Once the internal data structures have been built using data from the ORM Specification 202, each class is fully understood in terms of its different components and how they can be stored and retrieved using the Object Class Definitions 204. Next, the ORM Data Structure Creation Unit 302 retrieves user objects of these classes and generates appropriate SQL statements to insert, update or delete various components of those objects. If objects need to be retrieved, the top-level objects are retrieved first (based on an optional search condition) and then their complex attributes are initialized after fetching the appropriate referenced objects as per the mapping information.

The remaining portions of the Database Exchange Unit 210, in addition to the ORM Data Structures 308, are used for the actual transfer of data and commands from the object-oriented system to the relational system, and vice versa. The Object Call Processing Unit 300 is coupled by line 250 to the application 216 to receive object-oriented commands/calls and data from the application 216. The Object Call Processing Unit 300 is also coupled to the OR Mapping Unit 304. The Object Call Processing Unit 300 receives calls and begins the translation of the object calls so that they can be executed on the relational system. More particularly, the Object Call Processing Unit 300 intercepts Application Programming Interface (API) level calls for object manipulation (query, insert, update, delete etc.) and executes those using OR Mapping Unit 304. Furthermore, a set of exemplary API calls which the Object Call Processing Unit 300 is responsive to are shown in Appendix C.

The OR Mapping Unit 304 is coupled to the Object Class Definitions 204, the ORM Data Structures 308, the Database Interface Unit 306, in addition to the Object Call Processing Unit 300. The OR Mapping Unit 304 is preferably routines or tools for performing the object-relational mapping using the ORM Data Structures 308, user objects (from the Object Class Definitions 204) and relational data (from the Database Interface Unit 306). The operation of the OR Mapping Unit 304 is described in more detail below with reference to FIGS. 14A and 14B. It should be noted that the Database Interface Unit 306 is used by the OR Mapping Unit 304 to access data from the relational database. The Schema Generator 212 may optionally use the Database Exchange Unit 210 to initialize the ORMMetadata Tables 214 with ORM Specification 202 and Named Sequence Generators 228.

Figure 6:
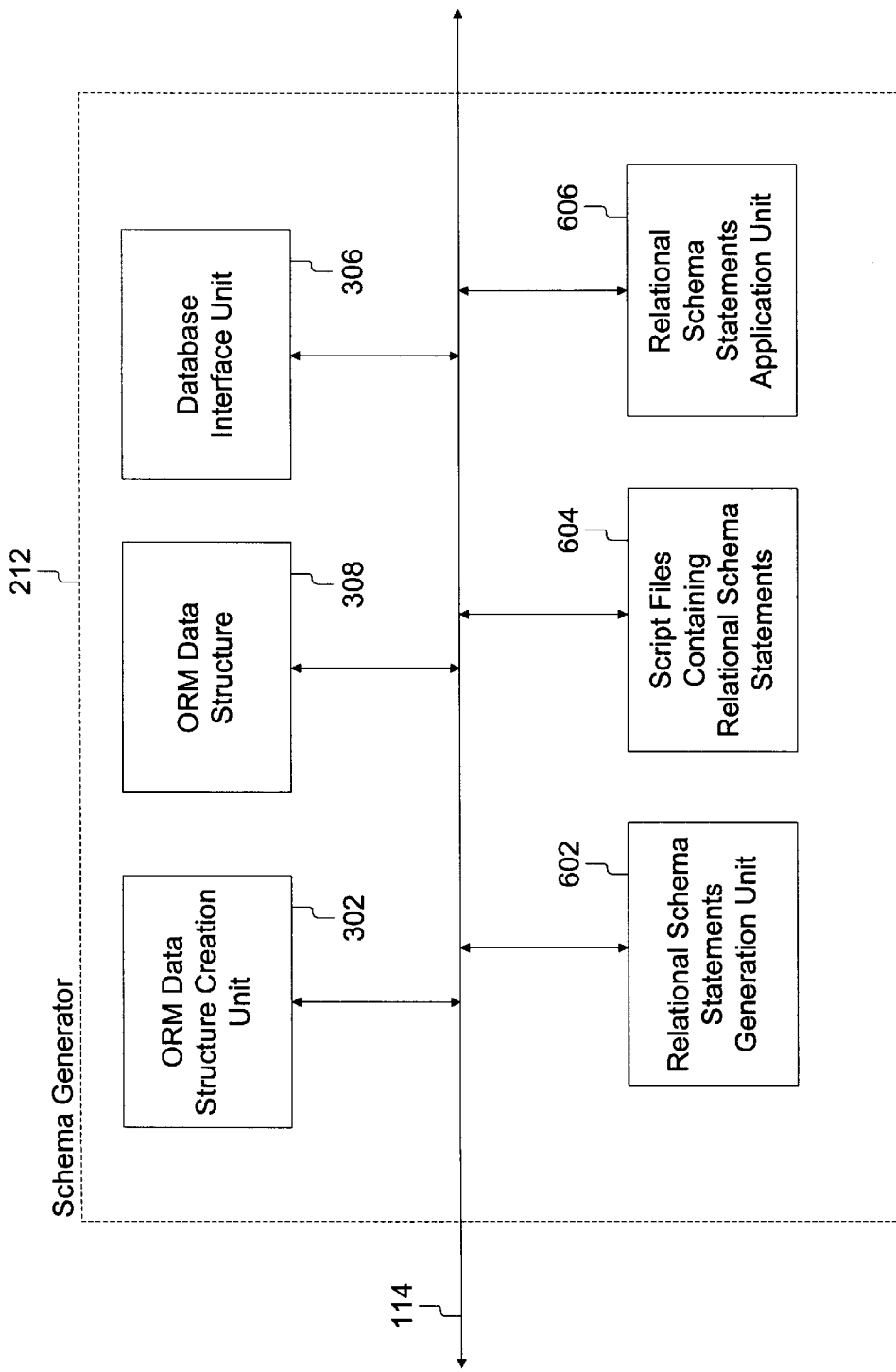
FIG. 6 is a block diagram of a first embodiment of a schema generator of FIG. 2 as routines stored in the memory of the system.

Referring now to FIG. 6, a block diagram of a first embodiment of the Schema Generator 212 is shown. For convenience and ease of understanding, like reference numerals have been used to reference like parts. Furthermore, while shown and described below as being included as part of the Schema Generator 212 in this embodiment, certain modules such as the ORM Data Structure Creation Unit 302, ORM Data Structures 308 and Database Interface Unit 306 could alternatively be part of the Database Exchange Unit 210 as described above, and omitted from the Schema Generator 212. In such an embodiment, the ORM Data Structure Creation Unit 302, ORM Data Structures 308 and Database Interface Unit 306 in the Database Exchange Unit 210 would be used by the Schema Generator 212.

The Schema Generator 212 preferably comprises the ORM Data Structure Creation Unit 302, the ORM Data Structures 308, the Database Interface Unit 306, a Relational Schema Statements Generation Unit 602, Script Files Containing Relational Schema Statements 604 and a Relational Schema Statements Application Unit 606. Each unit 302, 306, 308, 602, 604 and 606 is preferably a routine or file stored in a block of memory 104 for controlling the processor 102 to perform the operations as will be described below. The ORM Specification (an ORMFile) 202 may be used to create the database schema, and this is done by the Schema Generator 212. The tables in the schema are preferably used to hold the data for the class objects. The units 302, 306, 308, 602, 604 and 606 are coupled by bus 114 as shown, and their operation and functionality will be described below with reference to FIG. 7.

Figure 7:
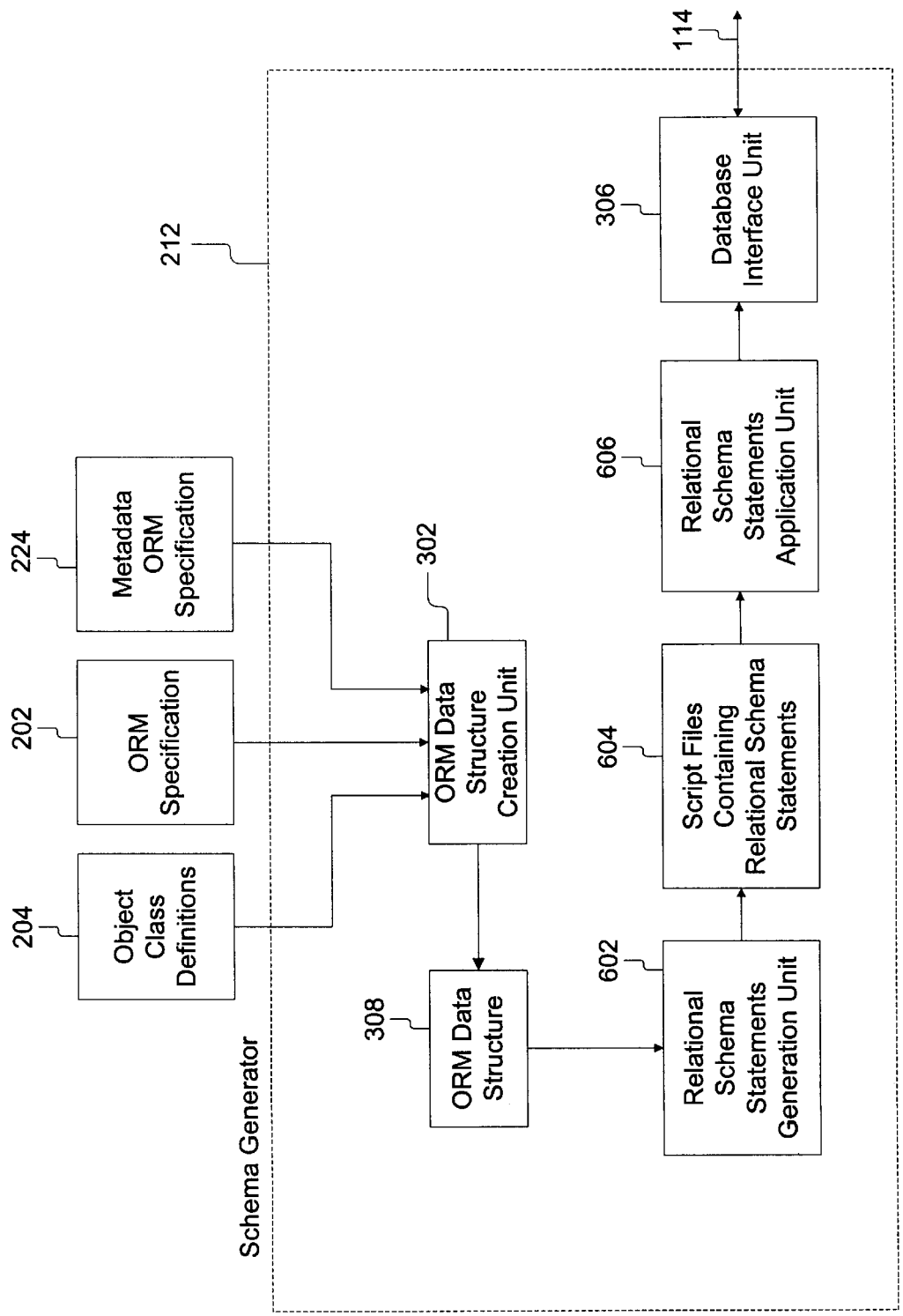
FIG. 7 is a block diagram of a second embodiment of the schema generator constructed as modules.

FIG. 7 is a block diagram of a second embodiment of the Schema Generator 212 constructed as modules. The operation of the Schema Generator 212 can best be understood by reference to the operation according to FIG. 7. As shown in FIG. 7, the ORM Data Structure Creation Unit 302 is coupled to the Object Class Definitions 204, the ORM Specification 202 and the Metadata ORM Specification 224. The Object Class Definitions 204, the ORM Specification 202 and the Metadata ORM Specification 224 are preferably stored in another portion of memory 104 as has been described above with reference to FIG. 2. The ORM Data Structure Creation Unit 302 uses the Object Class Definitions 204 and either the ORM Specification 202 or the Metadata ORM Specification 224 to generate an ORM Data Structures 308 as has been described above with reference to FIG. 5. The ORM Data Structures 308 created for Metadata ORM Specification 224 can be used to store ORM Specification 202 and Named Sequence Generators 226 as information in ORMMetadata Tables 214. The ORM Data Structures 308 has a format and content as described above. The ORM Data Structures 308 is coupled as an input to the Relational Schema Statements Generation Unit 602. The Relational Schema Statements Generation Unit 602 is a routine or tools to produce statements that will produce the relational schema in the RBDMS 206. Using the information about the schema for the relational system contained in the ORM Data Structures 308, the Relational Schema Statements Generation Unit 602 produces the Script Files Containing Relational Schema Statements 604. The operation of the Relational Schema Statements Generation Unit 602 is described in more detail below with reference to FIG. 12. The output of the Relational Schema Statements Generation Unit 602 is coupled to the input of the Relational Schema Statements Application Unit 606 to provide the Script Files Containing Relational Schema Statements 604 produced by the Relational Schema Statements Generation Unit 602. The Relational Schema Statements Application Unit 606 is also coupled to the Database Interface Unit 306 and applies the commands necessary to produce the schema in the database with the table names and definitions. More particularly, the Relational Schema Statements Application Unit 606 through the Database Interface Unit 306 issues the commands from Script Files Containing Relational Schema Statements 604 to the RDBMS 206.

Figure 8:
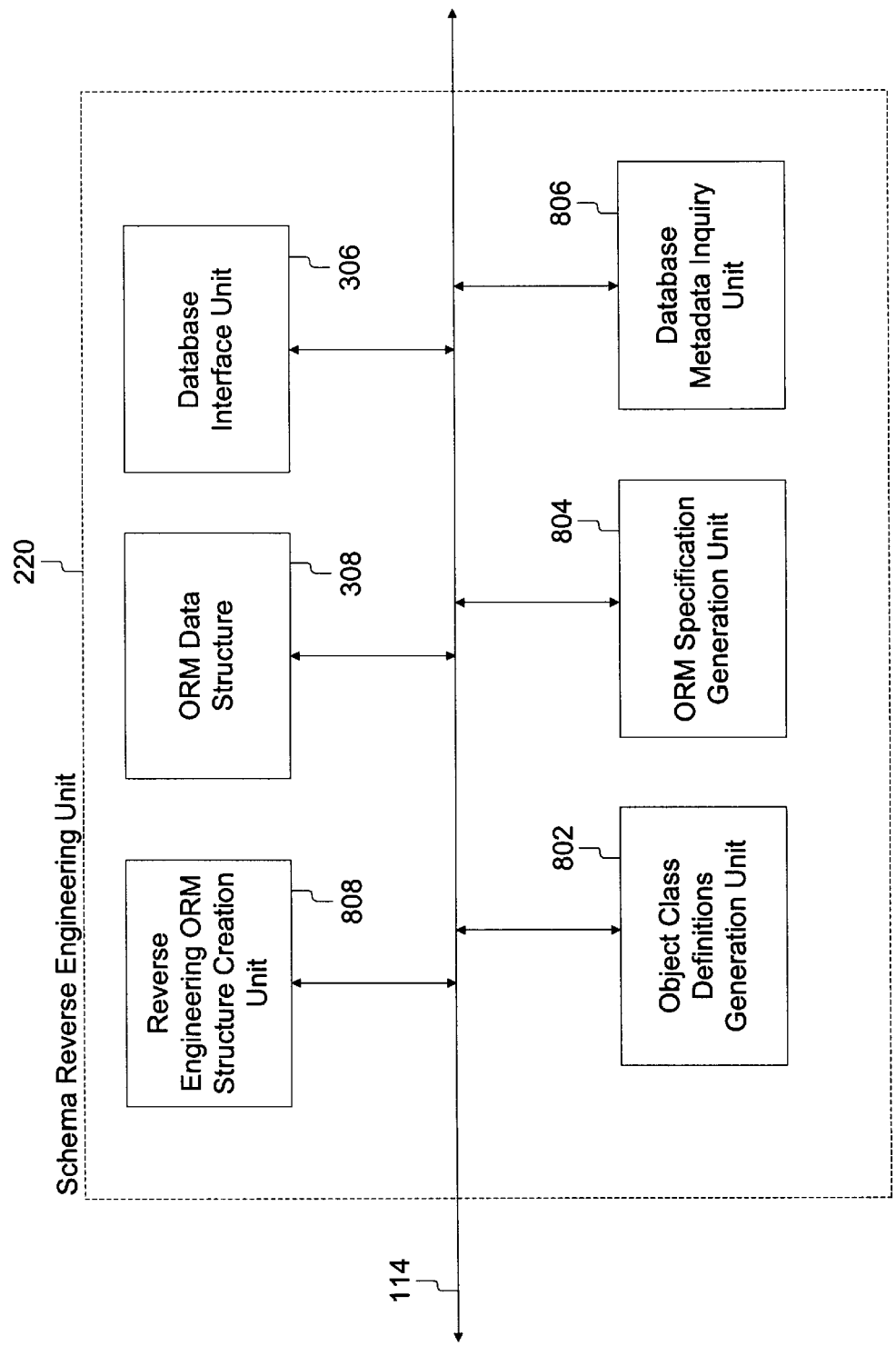
FIG. 8 is a block diagram of a first embodiment of a schema reverse engineering unit of FIG. 2 as routines stored in the memory of the system.

Referring now to FIG. 8, a block diagram of a first embodiment of the Schema Reverse Engineering Unit 220 is shown. As noted above, the Schema Reverse Engineering Unit 220 is a tool to create an ORM Specification 202 and Object Class Definitions 204 given a database schema. Again, for convenience and ease of understanding, like reference numerals have been used to reference like parts, and while shown and described below as being included as part of the Schema Reverse Engineering Unit 220 in this embodiment, certain modules such as the ORM Data Structures 308 and Database Interface Unit 306 could alternatively be part of the Database Exchange Unit 210 as described above. In such an alternate embodiment, the Schema Reverse Engineering Unit 220 uses the ORM Data Structures 308 and Database Interface Unit 306 in the Database Exchange Unit 210. The Schema Reverse Engineering Unit 220 preferably comprises the Database Interface Unit 306, the ORM Data Structures 308, the Object Class Definitions Generation Unit 802, the ORM Specification Generation Unit 804, the Database Metadata Inquiry Unit 806 and the Reverse Engineering ORM Structure Creation Unit 808. These modules 306, 308, 802, 804, 806, 808 are preferably routines stored in memory 104 and coupled by bus 114.

Figure 9:
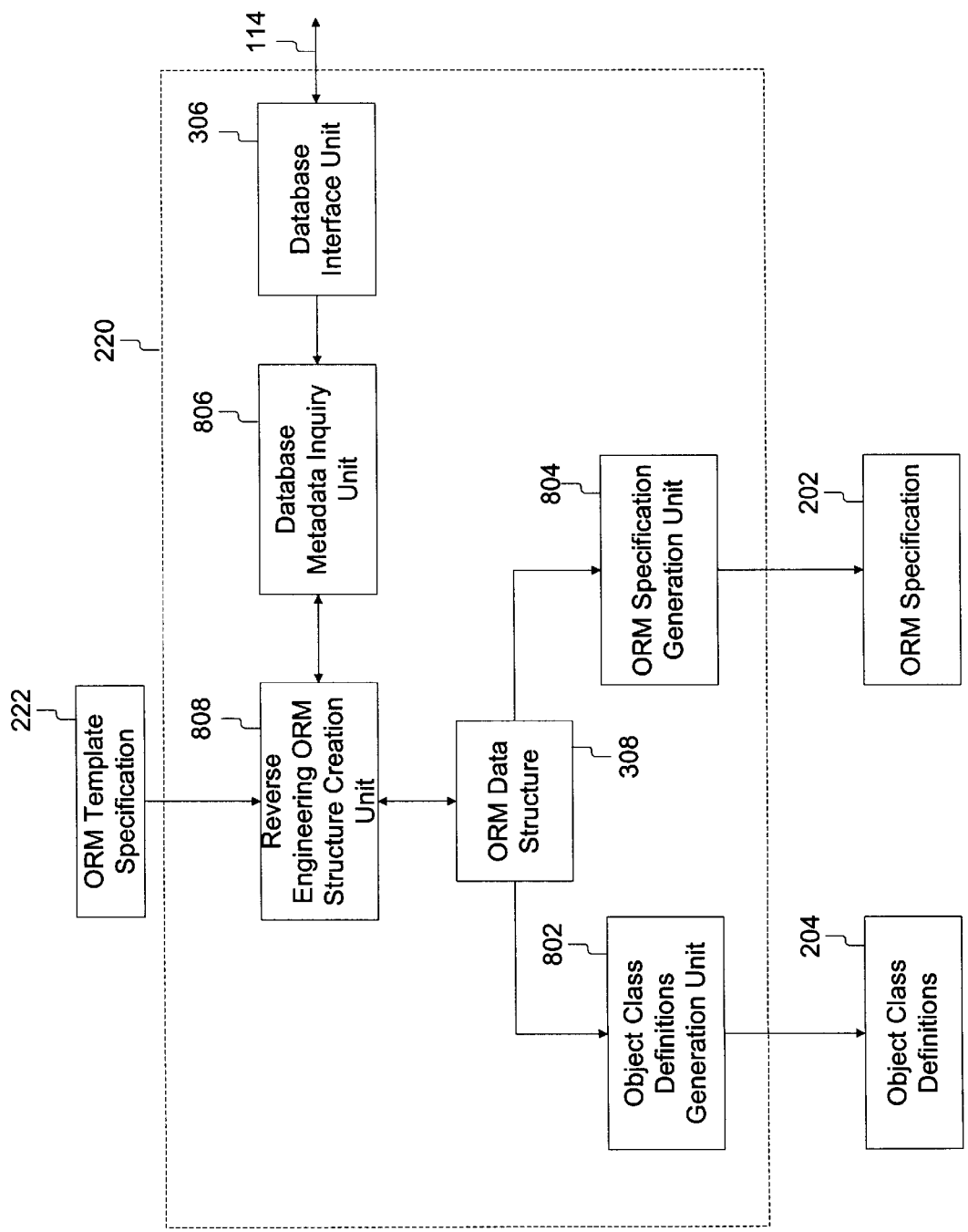
FIG. 9 is a block diagram of a second embodiment of the schema reverse engineering unit constructed as modules.

Referring now to FIG. 9, a block diagram of a second embodiment of the Schema Reverse Engineering Unit 220 is shown. The ORM Template Specification 222 is a simplified ORM Specification with the names of tables to be considered or used for generating Object Class Definitions 204 and is provided to the Reverse Engineering ORM Structure Creation Unit 808. The Reverse Engineering ORM Structure Creation Unit 808 is also coupled to the RDBMS 206 (not shown in FIG. 9) by the Database Metadata Inquiry Unit 806 and the Database Interface Unit 306. The Database Metadata Inquiry Unit 806 accesses the RDBMS 206 using the Database Interface Unit 306 to retrieve metadata including the schema for the relational model and information about the object model. The Database Metadata Inquiry Unit 806 provides the metadata to the Reverse Engineering ORM Structure Creation Unit 808. The Reverse Engineering ORM Structure Creation Unit 808 receives the ORM Template Specification 222. The ORM template information contains the names of the tables to be used for generating Object Class Definitions 204. The Reverse Engineering ORM Structure Creation Unit 808 uses the basic ORM template information along with the metadata to produce ORM Data Structures 308. The ORM Data Structures 308 is in turn used by the Object Class Definitions Generation Unit 802 and the ORM Specification Generation Unit 804 to produce the Object Class Definitions 204 and the ORM Specification 202, respectively. The operation of the components of the Reverse Engineering ORM Structure Creation Unit 808 is described in more detail with reference to FIG. 13 below.

One advantage of the present invention is that the structure of the ORM Specification 202 provides a very convenient way of experimenting with an Object-Relational Mapping. Since the ORM Specification 202 is stored as a text file, and the Database Exchange Unit 210 can be easily generated from the ORM Specification 202, the user can continue to refine and use the ORM Specification 202 until the user is satisfied with the results of Object-Relational Mapping. Furthermore, after the user is satisfied with the ORM Specification 202, the present invention stores this information at a common place such that many other applications or instances of the same application running on different machines can utilize this information. More specifically, the present invention stores it in the ORMMetadata Tables 214 that are part of the database 206.

Figure 10:
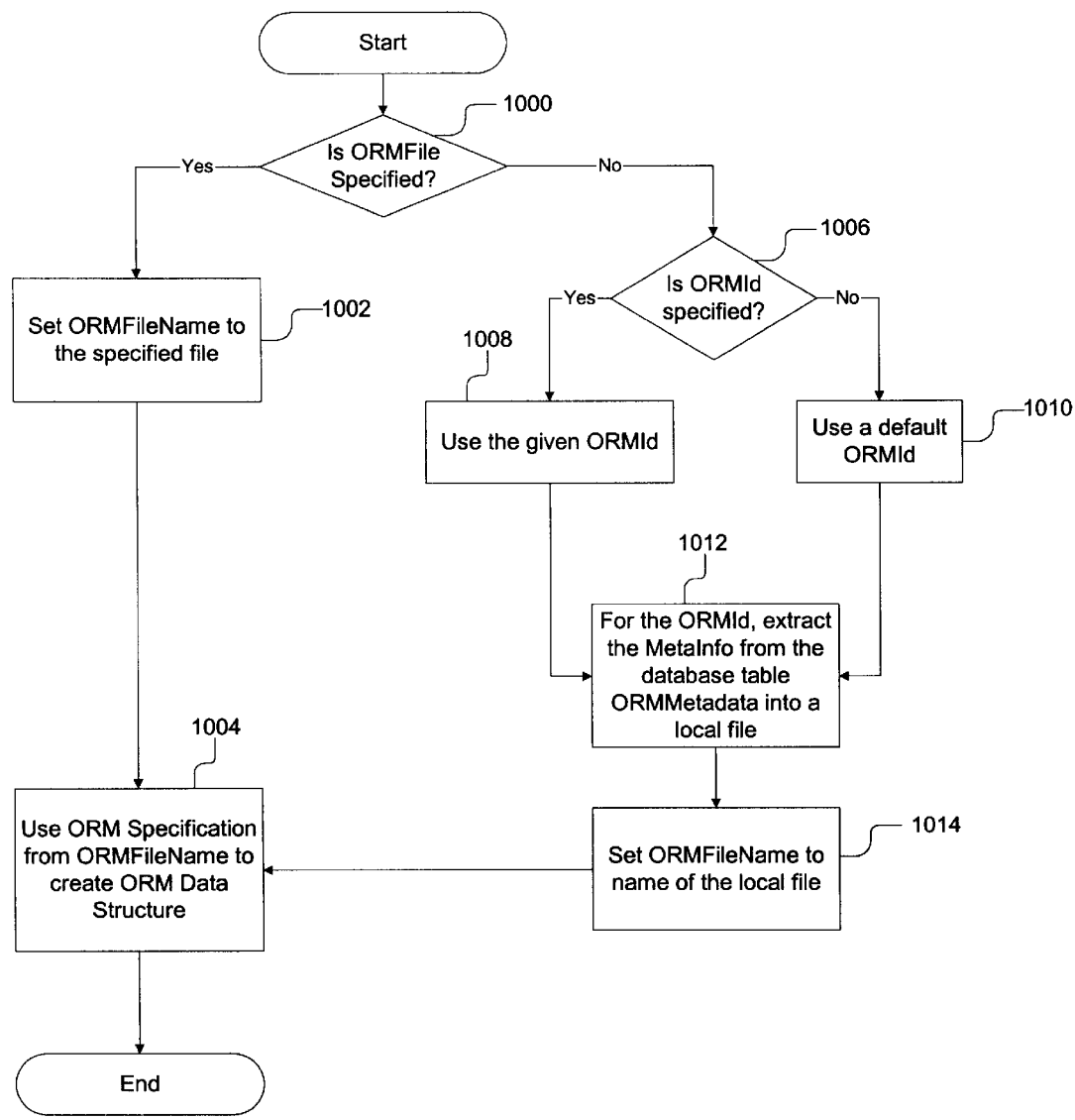
FIG. 10 is a flowchart of the preferred process for generating an ORM Data Structure according to the present invention from an ORMID or ORM file.

Referring now to FIG. 10, a flow chart of the preferred process for generating ORM Data Structures 308 according to the present invention from an ORM Id or ORM Specification (ORM file) 202 is shown. Each ORM specification 202 for mapping object classes into relational data is uniquely identified in the present invention by an object-relational mapping identification name (ORMId). An ORMId defines a view of objects over a set of tables. There may be multiple such views (overlapping or non-overlapping) identified by different ORMIds on the same database. ORMIds help in partitioning the relational data into different object spaces. The application 216 just needs to deal with only the relevant partition instead of worrying about all the tables and all the different classes defined using those tables. The ORMId is preferably part of the <DATABASE-URL> defined in Appendix B.

With the present invention, the user is able to indicate that a specific file should be used to determine the mapping between the object model and the relational model. The user must either specify a particular file by providing an ORM file or provide an identification to an existing ORM Specification 202 stored in the database 206. Otherwise a default ORM Id for a default ORM Specification 202 stored in the database 206 will be used. The process begins with step 1000 by determining whether an ORM file has been specified. If an ORM file has been specified, then the method proceeds to step 1002 where the process is set to use the ORM file specified. This is done by setting the variable ORMFileName to the specified file. After step 1002, the method proceeds to step 1004 where the method uses the ORM Specification 202 corresponding to the ORMFileName to create an ORM Data Structures 308. The operations performed by the system 100 in step 1004 will be provided in more detail below with reference to FIG. 11. After step 1004, the process is complete and ends. On the other hand, if in step 1000, an ORM file was not specified, then the method continues to step 1006. In step 1006, the method determines whether an ORM identification (Id) has been specified. If an ORM Id has been specified, method continues in step 1008 and uses the given ORM Id to set the variable ORMID. If an ORM Id has not been specified, the method continues in step 1010, and uses a default ORM Id to set the variable ORMID. For example, the default ORM Id is the string "defaultORMId". After either step 1008 or step 1010 the method proceeds to step 1012. In step 1012, for the variable ORMID, the method extracts Metainfo from the database table, ORMMetadata Tables 214, into a local file. Then in step 1014, the method sets the variable ORM-FileName to the name of the local file created in step 1012. After step 1014, the method proceeds to step 1004 and creates the ORM Data Structures 308 as has been described above. As can be seen from steps 1000 to 1014, the method of the present invention is particularly advantageous because by providing the system 100 with an ORM file, or an ORM Id or just using the default ORM Id, the system 100 can generate the ORM Data Structures 308 which specifies the mapping between the relational model and the object-oriented model. This is particularly advantageous because it allows the translation between the object-oriented model and relational model to be stored in a persistent manner either within the database 206, on the network (not shown) and accessed via the network interface 112, or in any one of a number of storage devices 110 coupled to the system 100.

When an object-oriented application program 216 wants to use a particular Object-Relational Mapping specification, it just has to specify the corresponding ORMId. Then it is a matter of retrieving the MetaInfo into a temporary file and using the process described above with reference to FIG. 10 to provide Object-Relational Mapping functionality. With some optional cleverness, a character stream may be realized over the MetaInfo field and the creation of a temporary file may be avoided. Even after permanently storing the Object-Relational Mapping information in the database 206, it may be possible to override that by specifying <ORMFile> clause in the <DATABASE-SPEC>. This gives a very innovative way of doing program development and refinement. The old programs continue to work with the stored specification while the new development may be happening with the new specifications in local text files.

Figure 11:
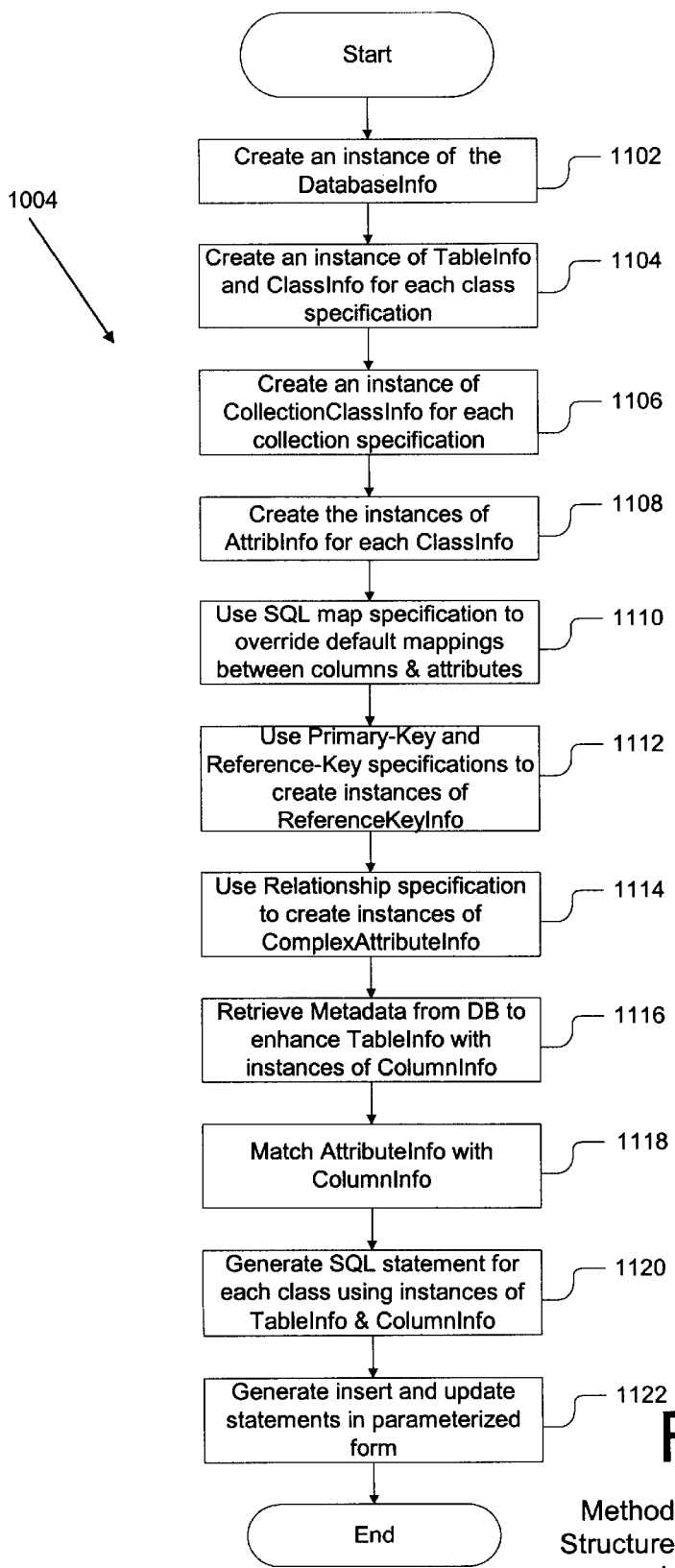
FIG. 11 is a flowchart of the preferred process for generating ORM Data Structures according to the present invention using an ORM specification.

Referring now to FIG. 11, a flow chart of the preferred process for generating the ORM Data Structures 308 according the present invention using an ORM Specification 202 and Object Class Definitions 204 is shown. This method corresponds to step 1004 of FIG. 10, and includes the steps necessary to create instances of each of the ORM Data Structures 308. Each of these ORM Data Structures 308 has been defined above in the discussion of FIG. 2. The method begins in step 1102 by creating an instance of DatabaseInfo. Next in step 1104, the method continues by creating an instance of TableInfo and ClassInfo for each class specification. Then the method continues by creating an instance of CollectionClassInfo for each collection specification. Then in step 1108, the method creates the instances of Attribinfo for each ClassInfo. Next in step 1110, the process uses any SQL map specification to override the default mappings between the columns and attributes. Then in step 1112, the method uses Primary-Key and Reference-Key specifications to create instances of ReferenceKeyinfo. The method continues in step 1114, by using the relationship specification to create instances of ComplexAttributeInfo. Then in step 1116 the system 100 retrieves Metadata from the database 206 to enhance TableInfo with instances of ColumnInfo. Next in step 1118, the method matches AttributeInfo with Column-Info. Then after step 1118, the method in step 1120 generates SQL statements for each class using the instances of TableInfo and ColumnInfo. Finally, in step 1122, the system 100 generates insert and update statements in parameterized form after which the process ends.

Figure 12:
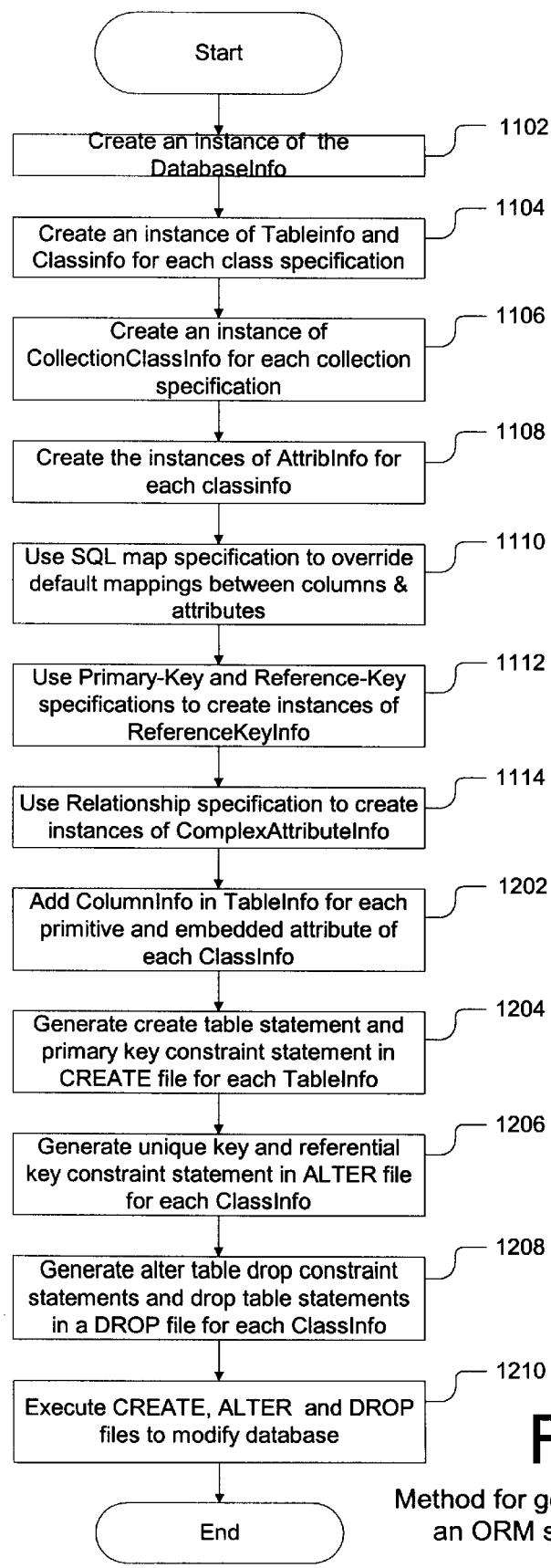
FIG. 12 is a flowchart of the preferred process for generating relational schema from an ORM specification and Object Class Definitions.

Referring now to FIG. 12, a flow chart of the preferred process for generating relational schema from an ORM Specification 202 and Object Class Definitions 204 is shown. As indicated FIG. 12, the preferred process for generating relational schema includes many of the same process steps described above with reference to FIG. 11 for the process of generating the ORM Data Structures 308. For convenience and ease of understanding, like reference numerals are used to indicate like steps including steps 1102 through 1114 which are preferably identical to the steps described above with reference to FIG. 11. Thus, the preferred method for generating relational schema from the ORM Specification 202 and the Object Class Definitions 204 begins by performing steps 1102 through 1114. However, after step 1114, the method of FIG. 12 continues in step 1202. In step 1202, the method adds ColumnInfo in TableInfo for each primitive and embedded attribute of each ClassInfo. Then in step 1204, the system 100 generates a create table statement and primary key constraint statement in a CREATE file for each TableInfo. Next in step 1206, the method generates unique key and referential key constraint statements in an ALTER file for each ClassInfo. Then in step 1208, the method generates alter table drop constraint statements and drop table statements in a DROP file for each ClassInfo. Finally in step 1210, the method executes the CREATE, ALTER and DROP files to modify the database 206.

Figure 13:
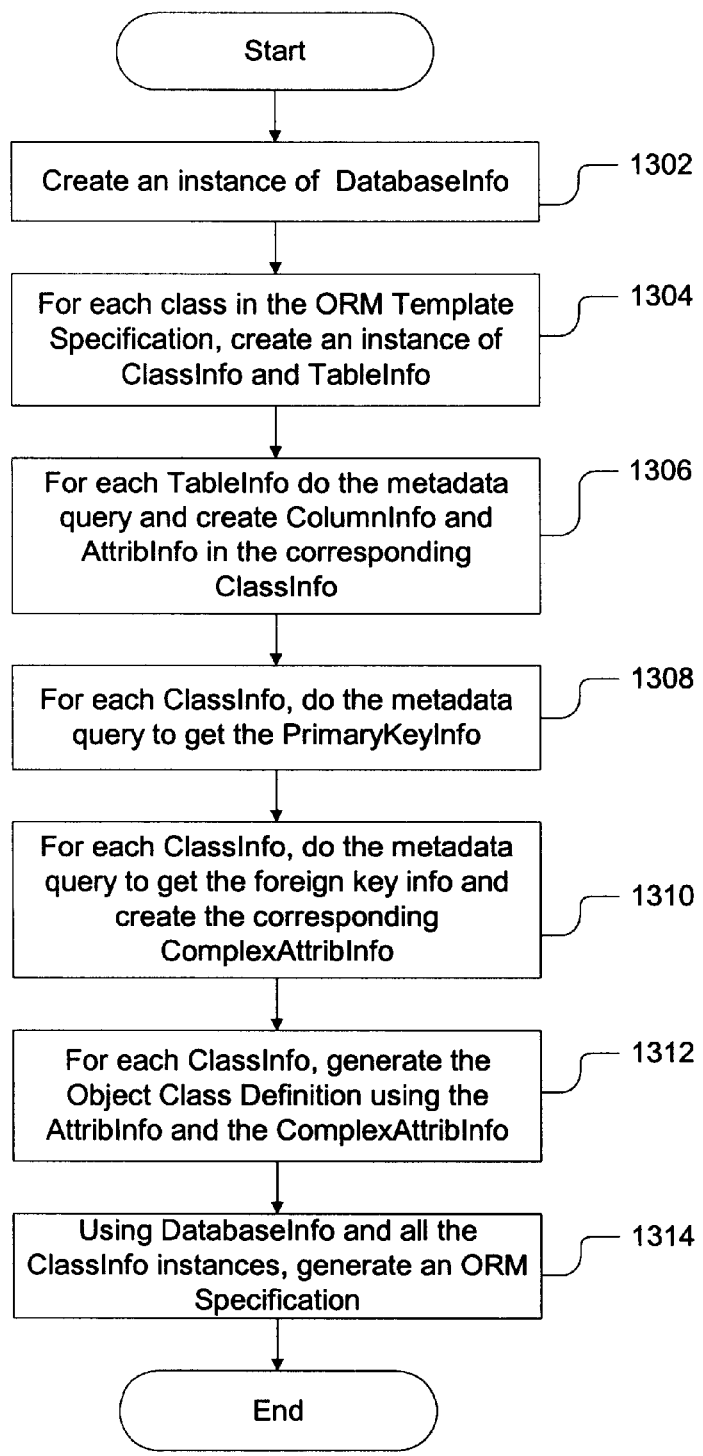
FIG. 13 is a flowchart of the preferred process for generating an ORM specification and Object Class Definitions from a database schema.

Referring now to FIG. 13, a flow chart of the preferred process for generating an ORM Specification 202 and Object Class Definitions 204 from a database schema is shown. The process for generating an ORM Specification 202 begins in step 1302 by creating an instance of DatabaseInfo. The method continues in step 1304 by creating an instance of ClassInfo and TableInfo for each class in the ORM Template Specification 222. The method then proceeds to step 1306 where a metadata query and creation of ColumnInfo and AttributeInfo in the corresponding ClassInfo are performed for each instance of TableInfo. Next in step 1308, the system 100 performs a metadata query to get the PrimaryKeyInfo for each ClassInfo. Then in step 1310, the method performs the metadata query to get the foreign key information and creates the corresponding ComplexAttributeInfo for each instance of ClassInfo. Then in step 1312, the method continues for each ClassInfo by generating the Object Class Definitions 204 using the AttributeInfo and ComplexAttributeInfo. Finally, in step 1314, an ORM Specification 202 is created using the DatabaseInfo and all the instances of ClassInfo.

Figure 14A:
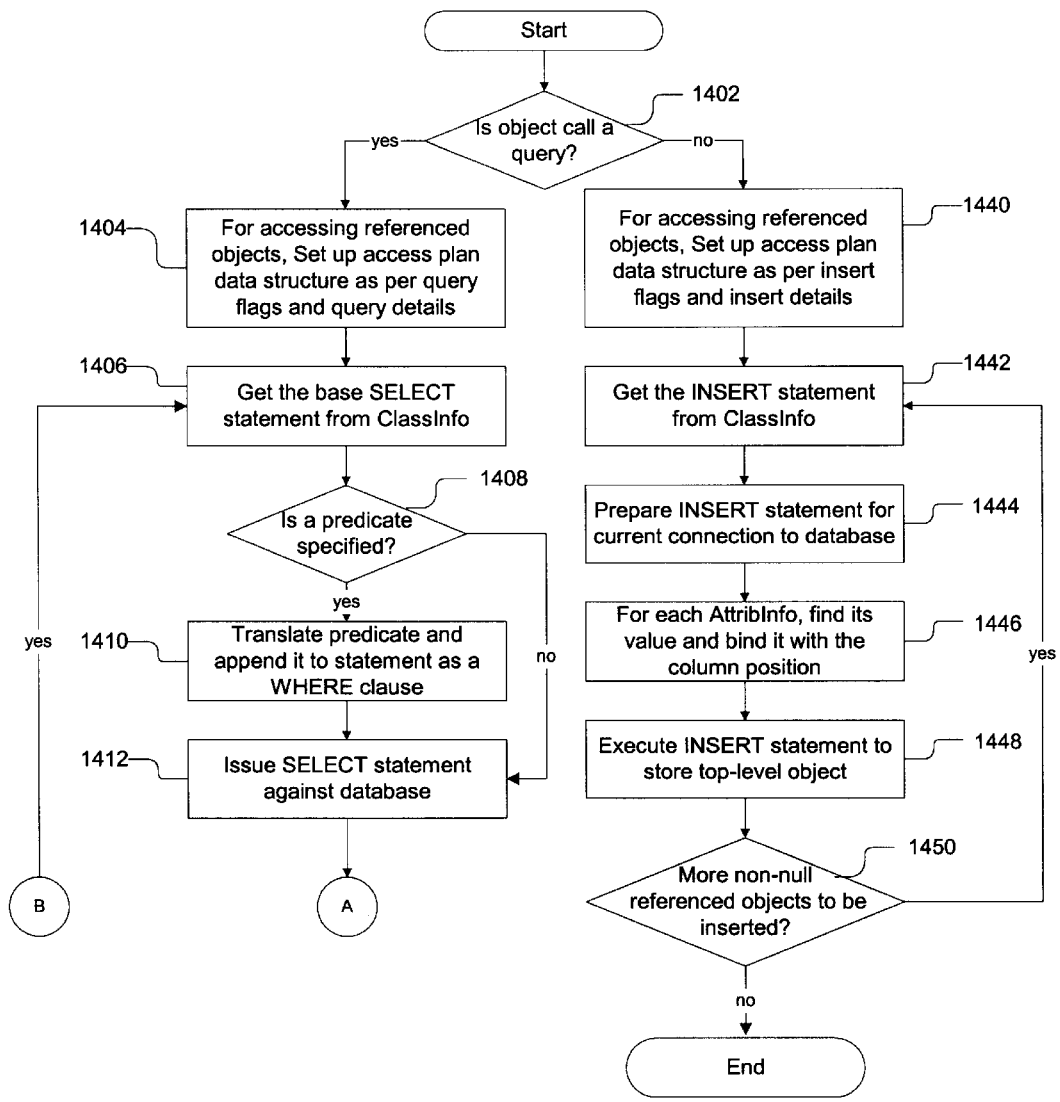
FIGS. 14A and 14B are a flowchart of the preferred process for responding to an object call using a mapping unit generated from an ORM specification.
Figure 14B:
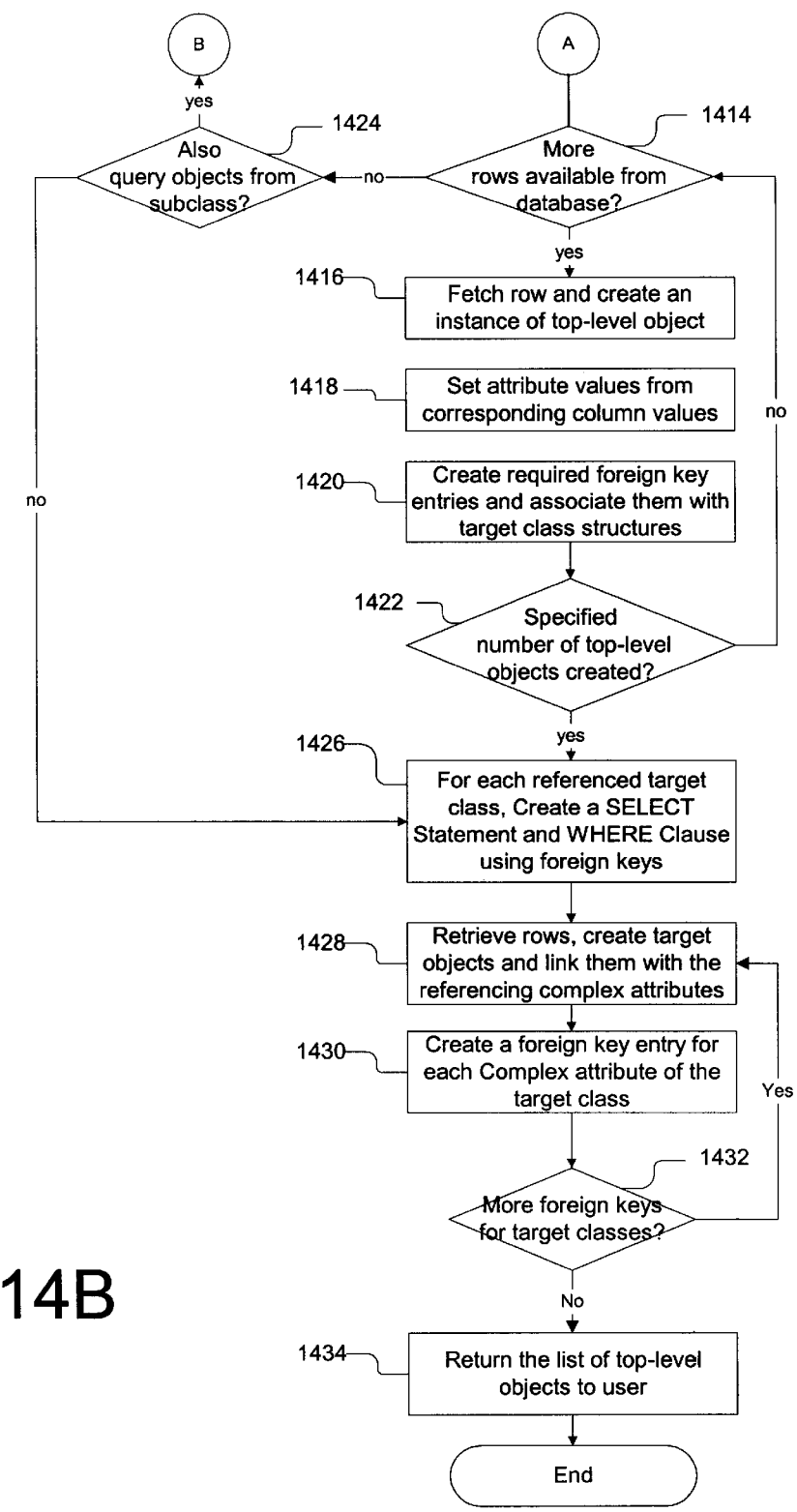

Referring now to FIGS. 14A and 14B, a flow chart of a preferred process for responding to an object call using the OR Mapping Unit 304 generated from the ORM Specification 202 is shown. The process begins in step 1402 with the system 100 testing whether an object call received through the Object Call Processing Unit 300 is a query. If the object call tested in step 1402 is determined to be a query, the method continues in step 1404. In step 1404, the method sets up the access planned data structure according to the query flags and query details in order to access referenced objects. Then in step 1406, the system 100 retrieves the base SELECT statement from ClassInfo. Next in step 1408, the method tests whether any predicate has been specified. If a predicate has been specified, the method continues from step 1408 to step 1410 before proceeding to step 1412. In step 1410, the method, in particular the OR Mapping Unit 304, translates the specified predicate and appends the predicate as a WHERE clause. If a predicate has not been specified, the method continues directly from step 1408 to step 1412. In step of 1412, the SELECT statement including a WHERE clause, if any, produced by steps 1406 through 1410 is issued against the database 206. Next, the method continues in step 1414 by determining whether more rows are available from the database 206. If more rows are available from the database 206, the method continues in step 1416. Otherwise, the method proceeds to step 1424 and tests whether there are query objects from the subclasses. If there are additional query objects from the subclasses, the method returns to step 1406 to process the objects of subclasses. If there are not additional query objects from subclasses, then the method continues in step 1426 as will be described below.

If in step 1414, the process determined that more rows are available from the database 206, then the method continues to step 1416. In step 1416, the system 100 fetches the next row and creates an instance of a top-level object. Then in step 1418, the system 100 sets the attribute values from the corresponding column values. Then in step 1420, the method creates the required foreign key entries and associates them with target class structures. After step 1420, the method continues in step 1422 to determine whether the specified number of top-level objects have been created. If the method determines that the specified number of top-level objects have not been created, then the method continues back to step 1414 and loops through steps 1416 to 1420 until a top-level object is created for each row in the database 206. On the other hand, if the method determines that the specified number of top-level objects have been created, then the method continues in step 1426. As shown in FIG. 14B, the method continues with step 1426 by creating a SELECT statement and a WHERE clause using the foreign keys for each referenced target class. After step 1426, the method retrieves rows, creates target objects and links them with the referencing complex attributes in step 1428. Then in step 1430, the method creates a foreign key entry for each complex attribute of the target class before proceeding to step 1432. In step 1432, the method tests whether there are more foreign keys for target classes. If there are, the method returns to step 1428 and performs both step 1428 and 1430 for each foreign key. If it is determined in step 1432 that there are no more foreign keys for the target class, the method proceeds to step 1434. In step 1434, the method returns the list of top-level objects to the user and then the method ends.

Referring back to FIG. 14A, if the object call tested in step 1402 is determined not to be a query, then the method assumes that it is an insert object call and proceeds to step 1440. Those skilled in the art will recognize that the present invention described in FIGS. 14A and 14B could be modified to handle updates and deletes in a similar fashion. In step 1440, the method sets up an access plan data structure as per insert flags and insert details for the accessing referenced objects. Next in step 1442, the method retrieves the INSERT statement from ClassInfo. In step 1444, the preferred process prepares an INSERT statement for the current connection to the database 206. Then in step 1446, the method finds its value and binds it with the column position for each AttribInfo. Next in step 1448, the process executes the INSERT statement to store the top-level objects. Finally, in step 1450 the method determines whether there are more non-null referenced objects to be inserted. If there are more non-null referenced objects to be inserted, the method returns to step 1442 to create an INSERT statement for each of them. If there are not any more non-null referenced objects, the processing of the insert object call is complete.

Figure 15:
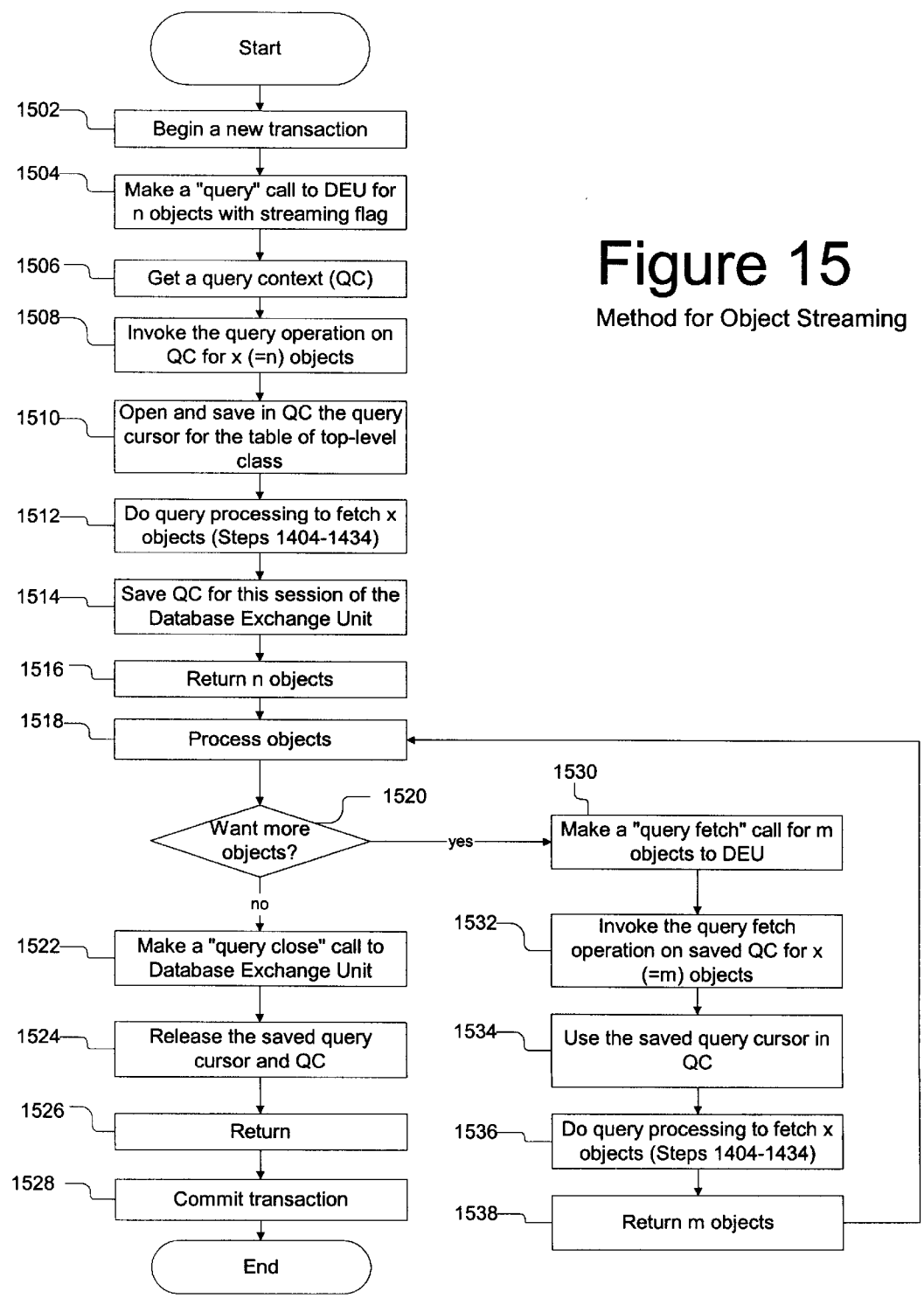
FIG. 15 is a flowchart of the preferred process for object streaming.

Referring now to FIG. 15, the novel and unique method for performing objects streaming will be described. As shown in FIG. 15, the process begins with step 1502 by beginning a new transaction. Next in step 1504, the system 100 generates a query call to the Database Exchange Unit 210 for a plurality of objects with the streaming flag. The number of objects is preferably defined as n, and those skilled in the art will understand that the number of objects may be any number of objects that the user desires. Next in step 1506, the system 100 determines a query context (QC) for streaming. Then in step 1508, the system 100 invokes the query operation on the query context for a predetermined number (X) of objects. In step 1510, the method opens and saves in the query context the query cursor for the table of top-level class objects. Then in step 1512 the system 100 initiates the query processing to fetch the predetermined number (X) of objects. This is done by performing steps 1404 through 1434 as has been described above with reference to FIG. 14. Then in step 1514, the query context is saved for this session of the Database Exchange Unit 210, and the objects are returned in step 1516. Next in step 1518 the objects are processed. In step 1520, the user may decide to get more objects through the current stream of objects. If the user does not want to get more objects through streaming, the method is moved to step 1522 by creating a "query close" call to the Database Exchange Unit 210. Then in step 1524, the saved query cursor and query context are released. Finally, in step 1526, the "query close" call finishes and in step 1528 the transaction is committed to the database 206. If it is determined in step 1520 that the user decides to get more objects from the stream, then the preferred method proceeds through steps 1530 through 1538. In step 1530, the process generates a "query fetch" call for a second preferred number (m) of objects to the Database Exchange Unit 210. Next in step 1532, the process of the present invention invokes the query fetch operation on the saved query context for the second predetermined number of objects. In step 1534, the query cursor saved in the query context is retrieved for use. Then in step 1536, the query is processed to fetch m objects. Again, this step is identical to step 1512 and is done by performing steps 1404 to 1434. After step 1538, all of the m objects are returned and the process returns to step 1518 to process the m returned objects. After step 1518, the user may continue to use the stream of objects iteratively as described earlier until the whole stream is exhausted or the user does not need any more objects.

Figure 16:
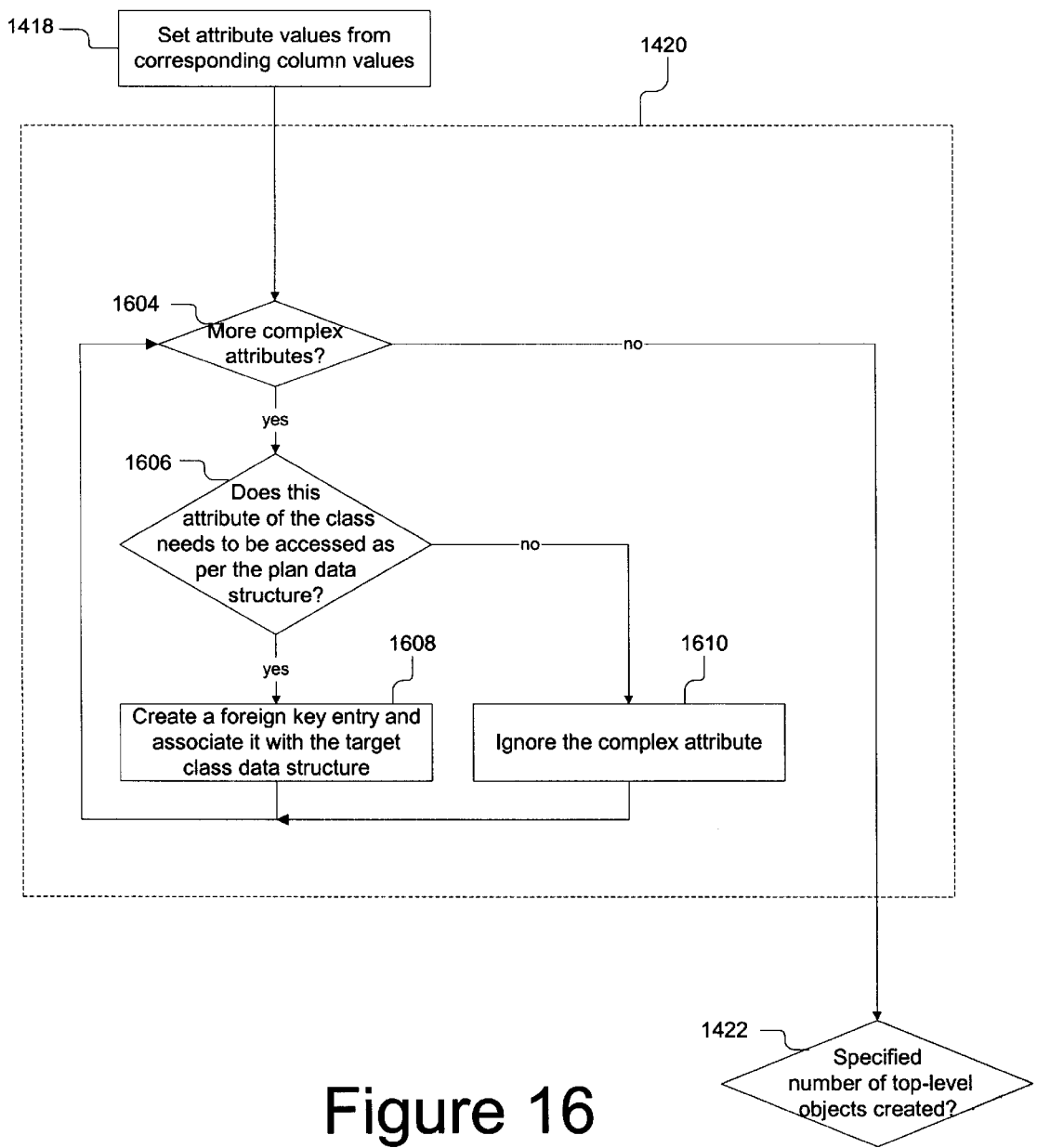
FIG. 16 is a flowchart of the preferred process for generating foreign key entries and associating them according to a plan data structure set up as per directed query options.

Referring now to FIG. 16, a preferred method for using directed operations for a query operation is shown. This was described in the context of performing the step of creating the required foreign key entry and associating it with the target class structures from FIG. 14A. Those skilled in the art will recognize that while the method for using directed operations is described here in the context of query operation, directed operations may be applied to insert, update and delete operations in a similar fashion. As shown in FIG. 16, the sub-process begins in step 1604 by determining whether or not there are more complex attributes. If there are no more complex attributes, the method is complete and continues onto step 1422 without any directed operations. However, if there are more complex attributes, then the method continues instead to 1606. In step 1606, the method determines whether this attribute of the class needs to be accessed as per the plan data structure. If in step 1606, the method determines that this attribute of the class does not need to be accessed according to the plan data structure then the process moves to step 1610 where the complex attribute is ignored before returning to step 1604. Otherwise, a foreign key entry is created and associated with the target class structure in step 1608 before the method returns to step 1604. This way the foreign key entries are made only for those complex attributes which need to be accessed as per the plan data specified by the user.

Referring now to FIGS. 20A–20D, block diagrams of various embodiments for architectural configurations of the present invention in different tiers (parts) of applications using different relational database management systems 206 are shown. In the exemplary embodiments shown below, the Database Exchange Unit 210 is preferably implemented in Java. Thus a variety of other embodiments will be understood to those skilled in the art.

Figure 20A:
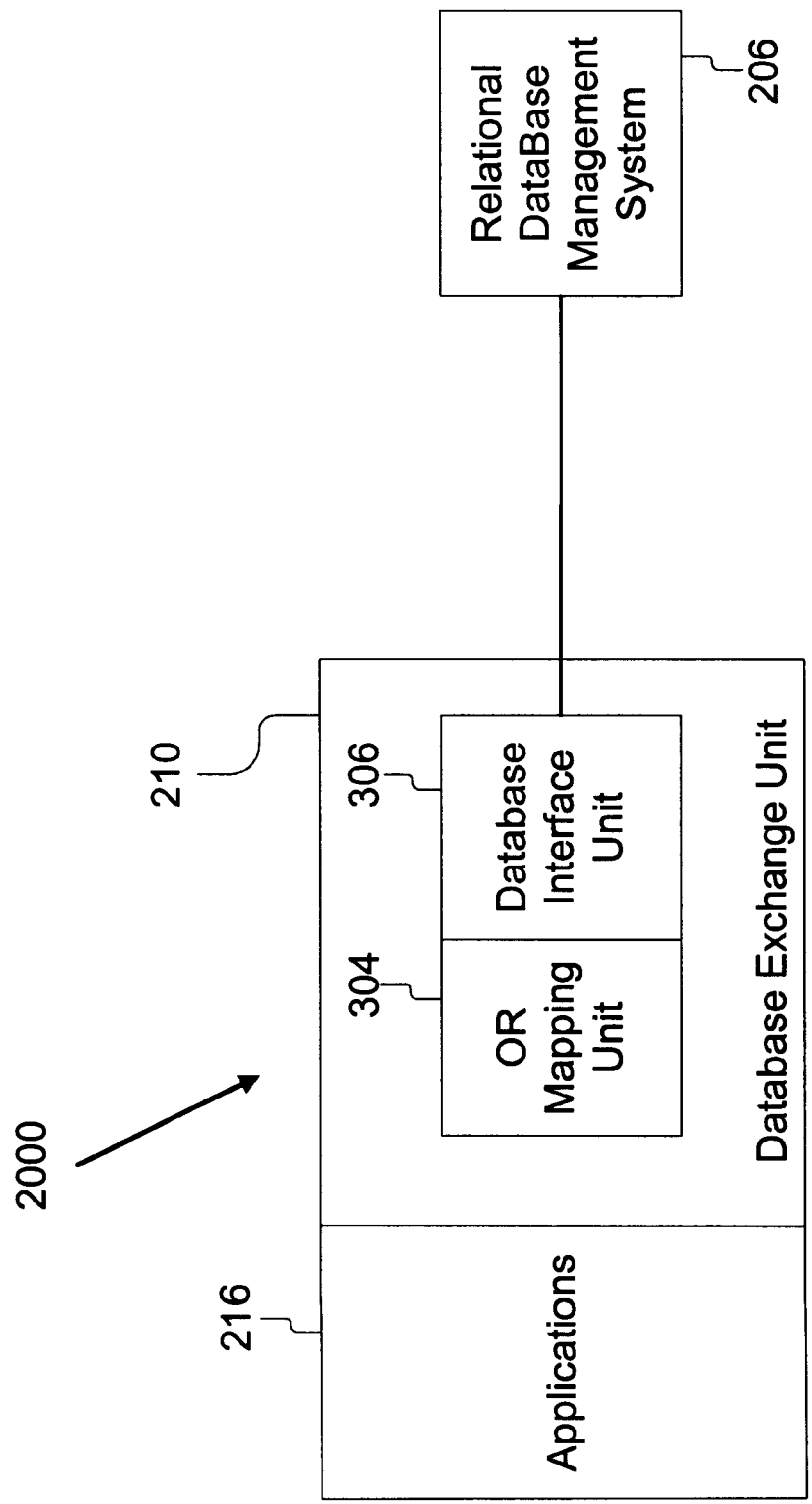
FIGS. 20A–20D are block diagrams of architectural configurations of the present invention in different tiers (parts) of applications using different relational database management systems.

FIG. 20A shows a stand alone application 2000 which is using the Database Exchange Unit 210, that is preferably a class libraries which execute as part of the application process in the same Java Virtual Machine Process (VMP). This mode may be useful during prototyping or simple applications. The same application can easily be split into 2 tiers with the Database Exchange Unit 210 providing the second tier. This is similar to how the Database Exchange Unit 210 has been described above.

Figure 20B:
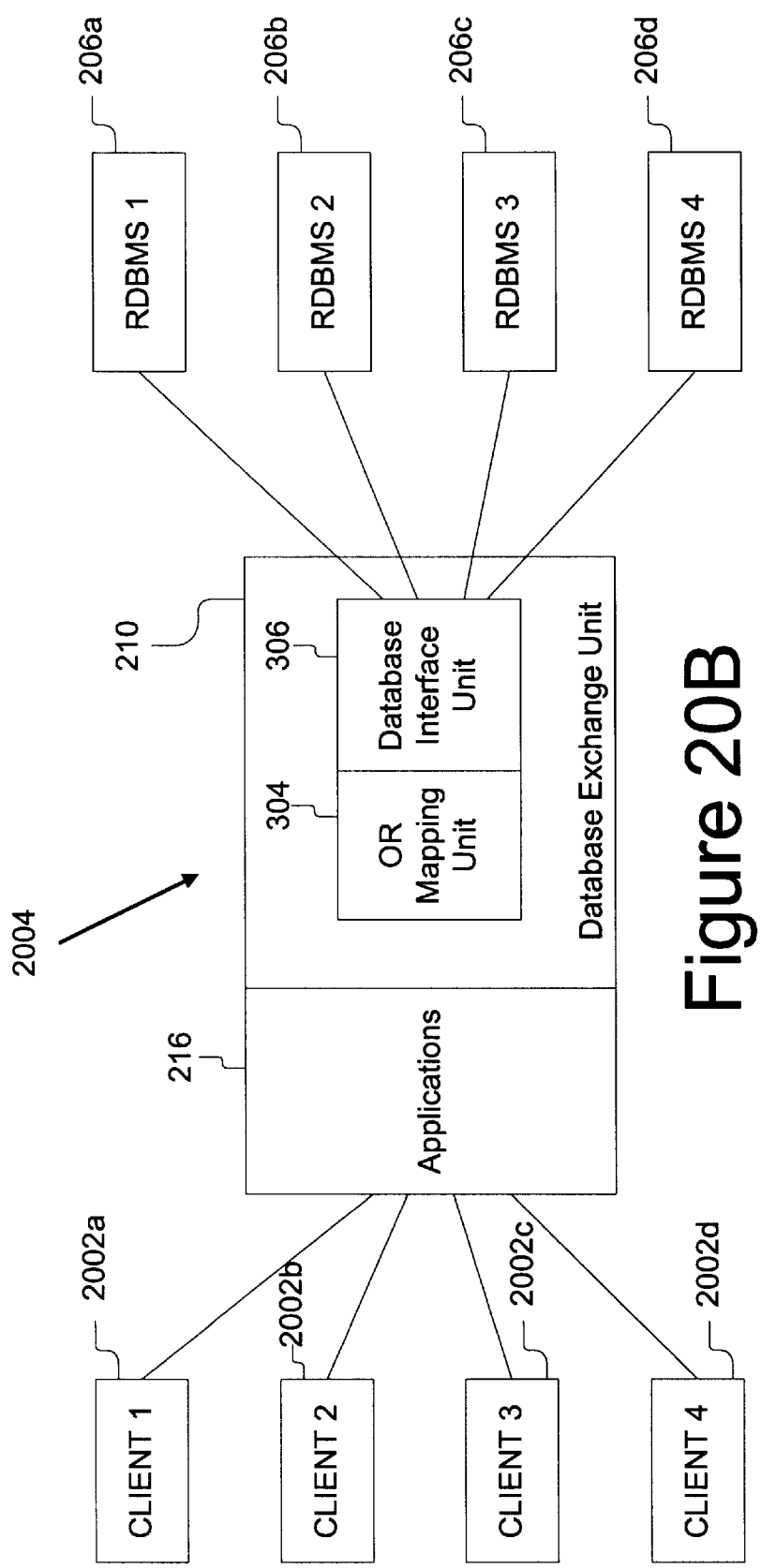

FIG. 20B shows a CORBA/RMI application server 2004 which is using Database Exchange Unit 210 as class libraries that execute as part of the application server process in the same Java VM. The server 2004 is serving multiple clients 2002a, 2002b, 2002c, 2002d, and is using multiple back end RDBMSs 206a, 206b, 206c, and 206d.

Figure 20C:
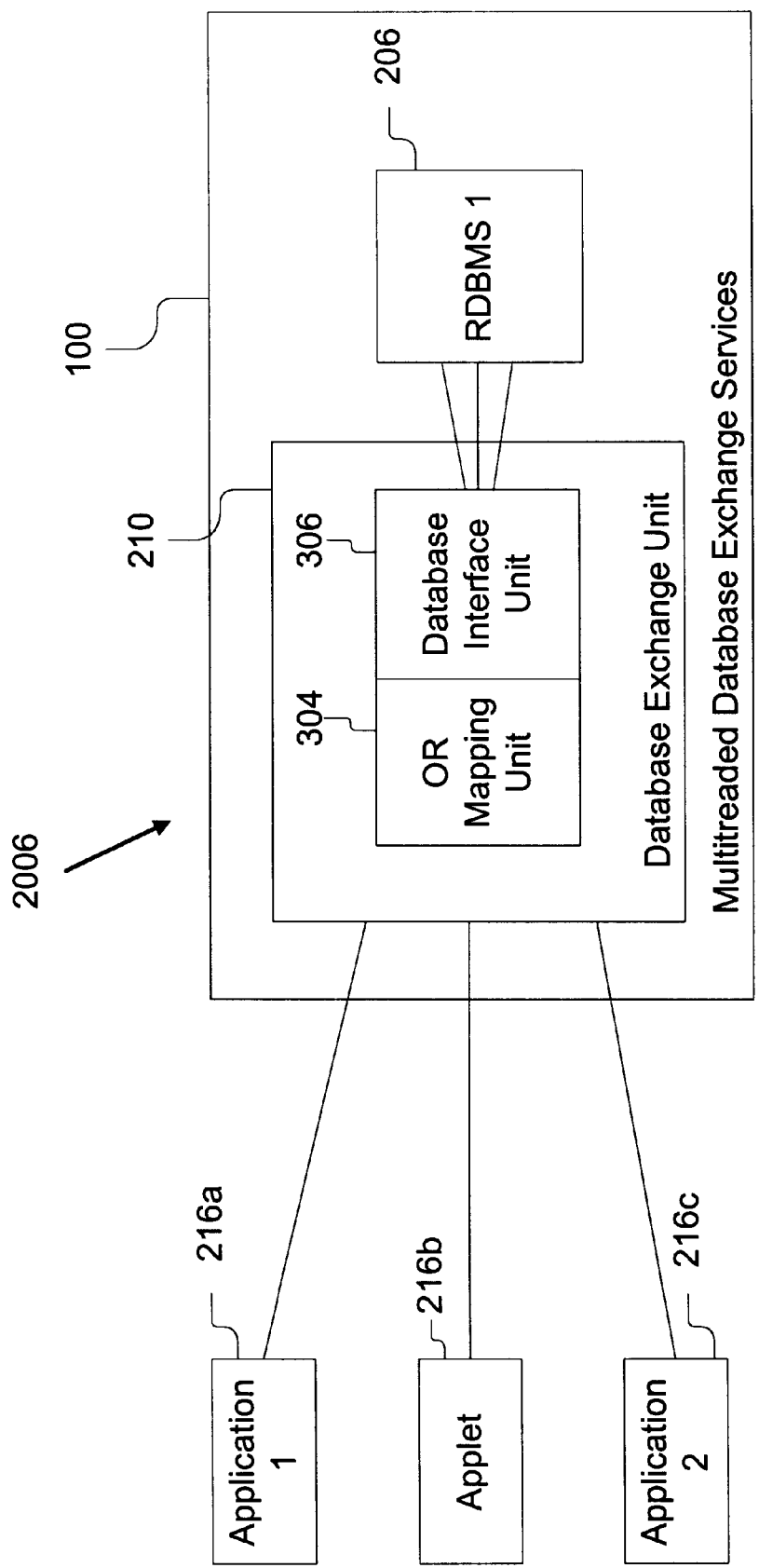

FIG. 20C shows multiple applications 216a, 216b, 216c attached to one Java Exchange server 2006 that is providing a multithreaded database exchange service for one RDBMS 206.

Figure 20D:
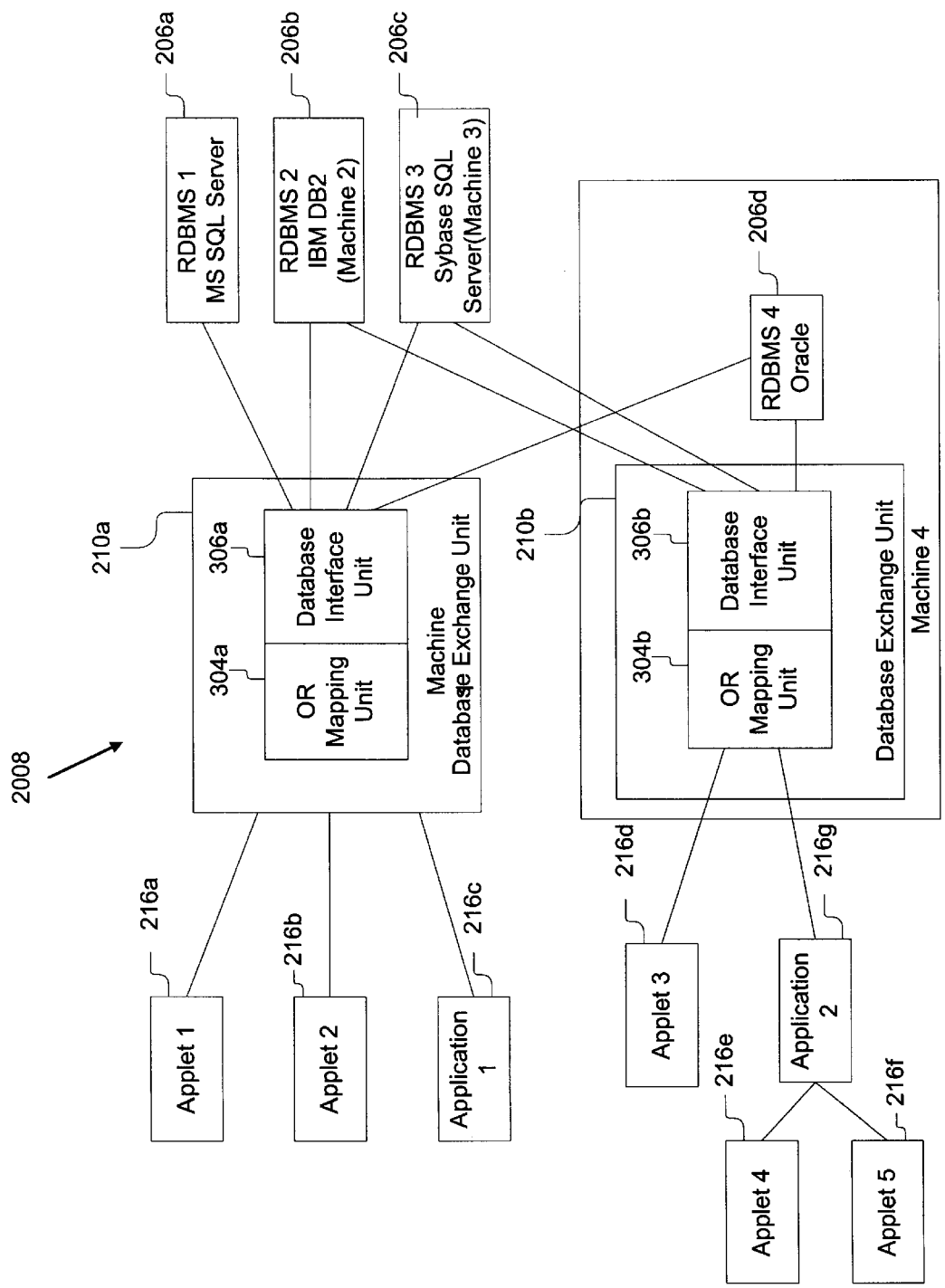

FIG. 20D shows multiple applications 216a, 216b, 216c, 216d, 216e, 216f of which are attached to two different Database Exchange Units 210a, 210b that are providing database exchange services for multiple RDBMS 206a, 206b, 206c, 206d of different types. The Database Exchange Units 210a, 210b may be distributed over many machines to provide scalability. They may be co-located with an RDBMS 206 on the same machine (e.g., Database Exchange Unit 210b and Oracle RDBMS above) for improved data transfer.

Figure 21A:
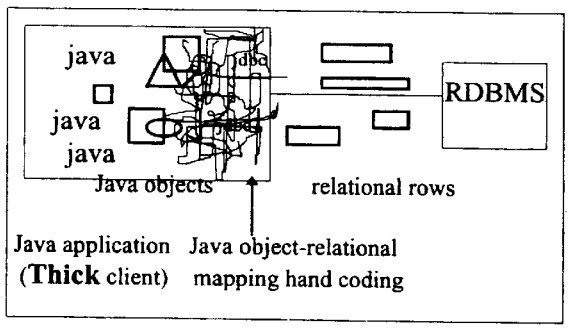
FIGS. 21A–21B are graphic block diagrams of architectural configurations without and with the present invention.
Figure 21B:
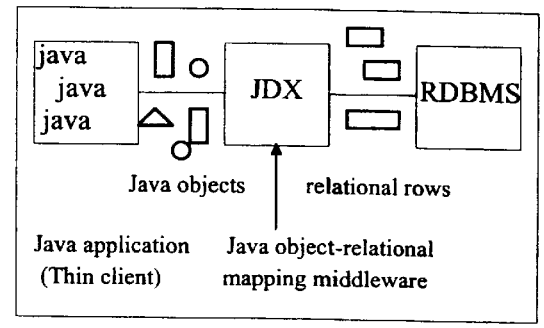

FIGS. 21A–21B are graphic block diagrams of architectural configurations without and with the present invention. These FIGS. 21A–21B show the advantage of the present invention. FIG. 21A shows the prior art where the database exchange units require hand coding to map the Java objects to existing RDBMSs. However, with the present invention all the hand coding is eliminated. With the simple declaration of the desired mappings between the object model and the relational model, the database exchange unit is automatically generated. Furthermore, the Database Exchange Unit can be generated from an ORM Specification or reverse engineered from object models and relational schema.

Figure 22A:
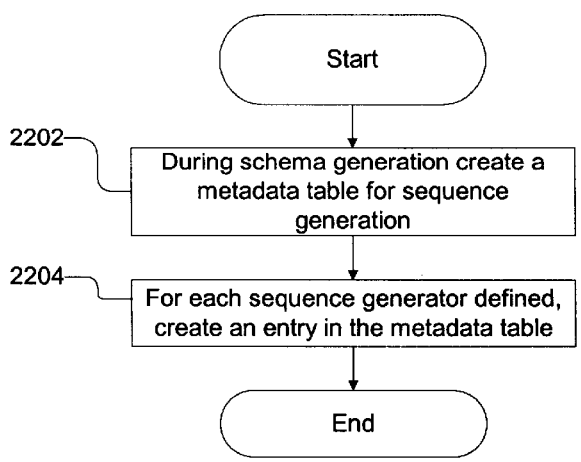
FIGS. 22A and 22B are flowcharts of the preferred process for generating Named Sequence Generators and using them to produce persistent object identification numbers.
Figure 22B:
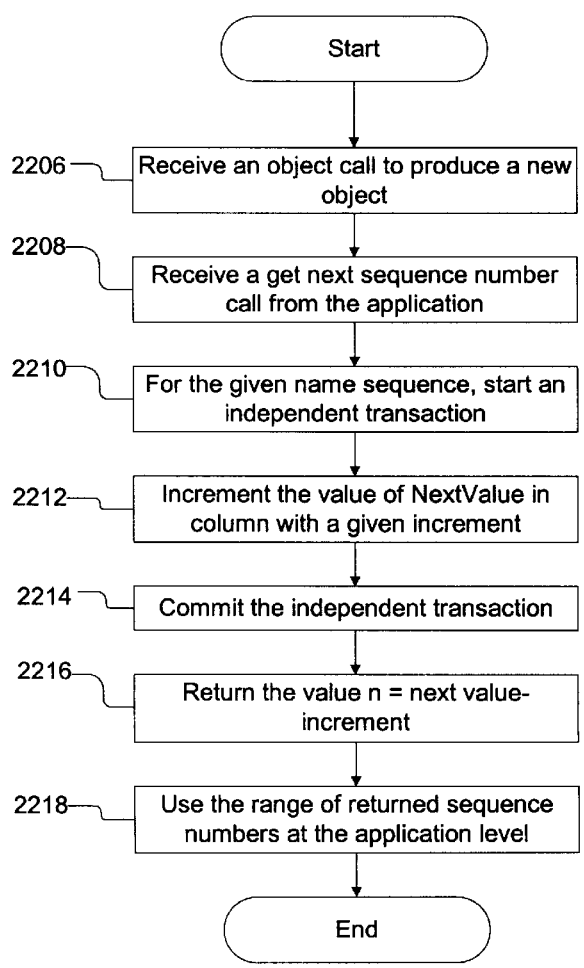

Referring now to FIGS. 22A and 22B, flow charts of the preferred process for generating Named Sequence Generators 226 and using them to produce persistent object identification numbers are shown. As has been noted above, the Named Sequence Generators 226 preferably include an application program interface (API) for retrieving sequence numbers. For example, the API in Java is "public long getNextSequence(String sequenceName, long increment) throws RemoteException, JDXException,"

In response, Named Sequence Generators 226 return the next available sequence number for the given 'sequenceName'. The persistent sequence number in the database 206 is incremented by 'increment' such that the calling application can safely assume that no other application would get the next sequence number in the range of (returned sequence number n, n+increment−1) both inclusive. In other words, this range (n, n+increment−1) presents a unique set of numbers with respect to the given sequenceName across all applications accessing the same RDBMS 206. These sequence numbers can typically be used to assign unique ids to different objects.

As shown in FIGS. 22A and 22B, the process has two portions: an initialization portion (design-time portion) and an execution portion (run-time portion). While the two portions of the process are shown and will be described as being performed in a linear manner, those skilled in the art will recognize that there may be a significant delay between performing initialization and performing execution. The initialization process begins in step 2202 during schema generation as has been described above. During schema generation, the process creates a metadata table "jdxSequence" in the database 206. The metadata table "jdxSequence" preferably has the following format CREATE TABLE jdxSequence(seqName varchar(80), starting value INT, jdxORMId varchar(80), maxIncrement INT, nextValue INT, CONSTRAINT JDX_PK_jdxSequence PRIMARY KEY (jdxORMId, seqName)). In other words, the method creates a table that indicates a sequence name, a starting value, a next value and an increment, along with other information. Next in step 2204, for each sequence generator defined in the <SEQUENCE-SPEC> the method creates an entry in the table jdxSequence. Once complete, the table identifies which sequence generators are available, and the rows in the table can be used for the generation of unique identification numbers, and this portion of the method is complete.

During execution, the method begins in step 2206 by receiving an object call to produce a new object or sequence id number. During runtime at the application level, a need often arises to get a range of unique sequence numbers (could be only one) such as to assign unique id numbers for new objects. Then in step 2208 the method receives a get next sequence number call from the application 216. Then in step 2210, the method starts an independent transaction for the given name sequence. Then in step 2212, the method increments the value of nextValue column with the given "increment" value for the sequence name. The method then commits the independent transaction to the database 206 in step 2214. In response in step 2216, the database 206 returns the value n which equals next value minus the increment. Finally, in step 2218, the application 216 uses the range of numbers generated by the system 100 at the application level. For example, the unique sequence ID name can be produced using the sequence name and the returned values.

While the present invention has been described with reference to certain preferred embodiments, those skilled in the art will recognize that various modifications may be provided. These and other variations upon and modifications to the preferred embodiments are provided for by the present invention.

What is claimed is:

1. A system for exchanging data between an object-oriented system and a relational system having tables defining a relational model, the system comprising:

at least one object class definition defining an object model;

an object relational mapping data structure defining a mapping between the object model and the relational model, the object relational mapping data structure produced from a declarative ORM Specification based on an ORM grammar;

an exchange unit for translating data from the object model to the relational model and for translating data from the relational model to the object model.

2. The system of claim 1, wherein the exchange unit further comprises:

an object call processing unit having inputs and outputs for receiving object calls and beginning the translation of the object calls, an input and an output of the object call processing unit coupled to the object-oriented system;

a mapping unit having inputs and outputs for performing the object-relational mapping according to the object relational mapping specification in response to signals from the object call processing unit, the mapping unit having inputs coupled to the object class definition, the object relational mapping data structure, and input and outputs the object call processing unit; and a database interface unit having inputs and outputs, for retrieving and storing data in the relational system, the inputs and outputs coupled to the relational system and the mapping unit.

3. The system of claim 2 wherein the object call processing unit intercepts Application Programming Interface (API) level calls for object manipulation and executes the API level calls using the mapping unit.

4. The system of claim 1, wherein the exchange unit further comprises:

an object relational mapping specification defining a mapping between the object model and the relational model, the object relational mapping specification including a plurality of a declarative ORM grammar statements; and an ORM Data Structure creation unit having inputs and an output for producing the object relational mapping data structure, the inputs of the ORM Data Structure creation unit coupled to receive the object class definition, the object relational mapping specification, and the database interface unit, the output of the ORM Data Structure creation unit coupled to the input of the mapping unit for providing the object relational mapping data structure.

5. The system of claim 1, further comprising a schema generator, the schema generator having inputs and outputs for generating a file of commands applicable on the relational system that implement the object call, the input of the schema generator coupled to the object class definition and the object relational mapping data structure, the output of the schema generator coupled to the relational system.

6. The system of claim 5, wherein the schema generator further comprises:

an ORM Data Structure creation unit having inputs and an output for producing the object relational mapping data structure, the inputs of the ORM Data Structure creation unit coupled to receive the object class definition and the object relational mapping specification;

a relational schema statements generation unit having an input and an output, the input of the relational schema statements generation unit coupled to the output of the ORM Data Structure creation unit for receiving the object relational mapping data structure, the relational schema statements generation unit producing a file of statements that will produce the relational schema in the relational system; and a relational schema statements application unit having an input and an output for applying statements to the relational system, the input of the relational schema statements application coupled to the output of the relational schema statements generation unit for receiving the file of statements that will produce the relational schema in the relational system, the output of the relational schema statements application unit coupled to the input of the database interface unit for applying the statements on the relational system.

7. The system of claim 1, wherein the relational system is a relational database management system.

8. The system of claim 7, further comprising:

a plurality of RDBMS Tables stored in the relational system, the plurality of RDBMS Tables setting forth the organization and structure of the data in the relational model in addition to describing certain functionality provided by the relational model; and a plurality of ORMMetadata Tables stored in the relational system, the plurality of ORMMetadata Tables storing additional object relational specifications.

9. The system of claim 1 further comprising a schema reverse-engineering unit for creating object class definitions and an object relational mapping specification using a database schema.

10. The system of claim 9, wherein the schema reverse-engineering unit further comprises:

an ORM template specification containing names of tables to be used for generating object class definitions;

database metadata inquiry unit for accessing the relational system to retrieve metadata including a schema for the relational model and information about the object model, the database metadata inquiry unit coupled to the relational system; and reverse engineering ORM structure creation unit for producing an object relational mapping data structure from metadata, the reverse engineering ORM structure creation unit coupled to the output of the database metadata inquiry unit to receive the metadata and coupled to receive the ORM template specification.

11. The system of claim 10, wherein the schema reverse-engineering unit further comprises an ORM specification generation unit for producing an ORM specification from the object relational mapping data structure, the ORM specification generation unit coupled to the object relational mapping data structure.

12. The system of claim 10, wherein the schema reverse-engineering unit further comprises an object class definitions generation unit for producing the object class definitions from the object relational mapping data structure, the object class definitions generation unit coupled to the object relational mapping data structure.

13. The system of claim 1, further comprising a named sequence generator for generating persistently unique sequence numbers, the named sequence generator having inputs and outputs, the named sequence generator coupled to the relational system for and coupled to the object-oriented system by the exchange unit.

14. The system of claim 1, wherein the object relational mapping data structure includes a mapping for a stored procedure executable by an engine in the relational system, the stored procedure being invokable by an application program using the exchange unit and creating an object with a value returned by executing the stored procedure.

15. The system of claim 1, wherein the system further comprises a security unit having inputs and outputs for determining whether a user can use the ORM Specification and a scope for use of the ORM Specification, the security unit coupled to control access to the object relational mapping data structure and the exchange unit.

16. A method for generating an object relational mapping data structure, the method comprising the steps of:
   determining whether an object relational mapping file has been specified;
   if an object relational mapping file has been specified, using an object relational mapping specification identified by the object relational mapping file as the identified object relational mapping specification;
   if an object relational mapping file has not been specified, determining an ORM identification name, retrieving an object relational mapping specification corresponding to the ORM identification name from a relational database, and using the retrieved object relational mapping specification as the identified object relational mapping specification; and
   creating an object relational mapping data structure using the identified object relational mapping specification.

17. The method of claim 16 wherein the step of determining an ORM identification name further comprises the steps of:
   determining whether an ORM identification name has been specified;
   using the ORM identification name specified if an ORM identification name has been specified; and
   using a default ORM identification name specified if an ORM identification name not has been specified.

18. A method for generating object relational mapping data structures from an object relational mapping specification includes the steps of:
   retrieving an object relational mapping specification;
   creating an instance of a plurality of data structures defining a mapping between an object model and a relational model;
   overriding default mappings using a SQL map specification;
   using additional specifications to create additional data structures;
   retrieving Metadata from a database to enhance the plurality of data structures;
   matching class information for object-oriented model with the plurality of data structures;
   generates SQL statements for each class; and
   generates inserts and update statements to apply SQL statements to the database.

19. The method of claim 18, wherein the step of creating an instance of a plurality of data structures includes the steps of:
   creating an instance of DatabaseInfo;
   creating an instance of Tableinfo and ClassInfo for each class specification;
   creating instance of CollectionClassInfo for each collection specification; and
   creating the instances of Attribinfo for each ClassInfo.

20. The method of claim 19, wherein the step of using additional specifications to create additional data structures includes the steps of:
   using primary-key and reference-key specifications to create instances of ReferenceKeyinfo; and
   using the relationship specification to create instances of ComplexAttributeInfo.

21. The method of claim 20, wherein the step of matching class information comprises the step of matching AttribInfo with ColumnInfo.

22. A method for generating relational schema from an ORM specification and object class definitions, the method comprising the steps of:
   retrieving an object relational mapping specification;
   retrieving an object class definitions;
   creating an instance of a plurality of data structures defining a mapping between an object model and a relational model;
   overriding default mappings using a SQL map specification;
   using additional specifications to create additional data structures; and
   adding relational information to the data structures for each primitive and embedded attribute of the object-oriented model.

23. The method of claim 22, wherein the step of creating an instances of a plurality of data structures includes the steps of:
   creating an instance of DatabaseInfo;
   creating an instance of Tableinfo and ClassInfo for each class specification;
   creating an instance of CollectionClassInfo for each collection specification; and
   creating the instances of Attribinfo for each ClassInfo.

24. The method of claim 23, wherein the step of using additional specifications to create additional data structures includes the steps of:
   using primary-key and reference-key specifications to create instances of ReferenceKeyinfo; and
   using the relationship specification to create instances of ComplexAttributeInfo.

25. The method of claim 23, wherein the step of adding adds ColumnInfo in Tableinfo for each primitive and embedded attribute of each ClassInfo.

26. The method of claim 23, wherein the step of generating statements for producing and modifying tables in relational database includes the steps of:
   generating a create table statement and primary key constraints statement in a CREATE file for each Tableinfo;
   generating unique key and referential key constraint statements in an ALTER file for each ClassInfo; and
   generating alter table drop constraint statements and drop table statements in a DROP file for each ClassInfo.

27. The method of claim 26, wherein the step of executing the generated statements on the database includes the step of executing the DROP, CREATE and ALTER files to modify the database.

28. A method for generating an ORM specification and object class definitions from a database schema, the method comprising the steps of:
   generating object relational mapping data structures using an ORM template specification;
   performing at least one metadata query to retrieve information for the object relational mapping data structures;

generating an object class definition using the object relational mapping data structures; and creating an ORM Specification using object relational mapping data structures.

29. The method of claim 28 wherein the step of generating object relational mapping data structures comprises the steps of:

creating an instance of DatabaseInfo; and creating an instance of ClassInfo and TableInfo for each class in the ORM Template Specification.

30. The method of claim 28 wherein the step of performing at least one metadata query includes the steps of:

performing a metadata query and creation of ColumnInfo and AttributeInfo in the corresponding ClassInfo for each instance of TableInfo;

performing a metadata query to get the PrimaryKeyInfo for each ClassInfo;

performing a metadata query to get the foreign key information and create the corresponding ComplexAttributeInfo for each instance of ClassInfo.

31. The method of claim 28 wherein the step of creating an ORM Specification using object relational mapping data structures is done using the DatabaseInfo and all the instances of ClassInfo.

32. A method for responding to an object call using a mapping unit, the method comprising the steps of:

determining the type of object call;

setting up an access plan data structure according to insert flags and insert details for accessing referenced objects;

creating a command statement for accessing relational system;

issuing the command statement on relational system; and processing the data from the relational system to provide it to the object-oriented system.

33. The method of claim 32 wherein the step of creating command statement for accessing relational system further comprises the steps of:

retrieving an INSERT statement from ClassInfo;

preparing the INSERT statement for the current connection to the database; and finding the value for each AttribInfo and binding it with the column position for each AttribInfo.

34. The method of claim 33 wherein the step of issuing the command statement on relational system includes issuing the INSERT statement to store top-level objects in the relational system.

35. The method of claim 34, wherein the step of issuing the INSERT statement to store top-level objects in the relational system, further comprises the steps of:

determining whether there are non-null referenced objects to be inserted, creating an additional INSERT statement for each non-null referenced objects if there are non-null referenced objects to be inserted; and issuing the additional INSERT statements.

36. A method for responding to an object call using a mapping unit, the method comprising the steps of:

determining the type of object call;

setting up an access plan data structure according to flags settings;

creating a command statement for accessing relational system by retrieving a base SELECT statement from ClassInfo, testing whether any predicate has been specified; and translating a specified predicate and appending the predicate as a WHERE clause, if a predicate has been specified;

issuing the command statement on relational system, the command statement including the SELECT statement having a WHERE clause, if any, against a database of the relational system; and determining whether more rows are available from the database;

if more rows are available from the database, fetching a next row and creating an instance of a top-level object;

setting attribute values from corresponding column values;

creating required foreign key entries and associating them with target class structures;

determining whether there are query objects from the subclasses; and if there are additional query objects from the subclasses, repeat the steps of creating command statement for accessing relational system and issuing the command statement on relational system for the objects of subclasses.

37. The method of claim 36 wherein the step of determining the type of object call includes the step of determining whether the object call is a query.

38. The method of claim 36 wherein the step of setting up access plan data structure according to flags settings includes the step of setting up the access plan data structure according to the query flags and query details in order to access referenced objects.

39. The method of claim 36 wherein the step of processing the data from the relational system to provide it to the object-oriented system includes the steps of:

creating a SELECT statement and a WHERE clause using the foreign keys for each referenced target class;

retrieving rows and creating target objects and linking them with referencing complex attributes;

creating a foreign key entry for each complex attribute of the target class; and returning a list of top-level objects to the application.

40. A method for object streaming comprising the steps of:

beginning a new transaction;

generating a query call to a database exchange unit for a plurality of objects;

returning the predetermined number (X) of objects;

processing the returned objects;

determining whether more objects are to be retrieved through the current stream of objects;

retrieving and processing an additional number (m) of objects if more objects are to be retrieved through the current stream of objects;

generating a query close to the database exchange unit; and committing the transaction to the database.

41. The method of claim 40 for object streaming further comprising the steps of:

determining a query context (QC) for streaming;

invoking a query operation on the query context for a predetermined number (X) of objects;

saving in the query context, the query cursor for the table of top-level class objects;

initiating a query processing to fetch the predetermined number (X) of objects; and saving the query context for this session.

42. The method of claim 40 wherein the step of retrieving and processing an additional number (m) of objects further comprises the steps of:

generating a "query fetch" call for the additional number (m) of objects to the database exchange unit;

invoking a query operation on the saved query context for the additional number (m) of objects;

retrieving the query cursor saved in the query context;

processing the query to fetch the additional number (m) of objects;

returning the additional number (m) of objects; and processing the returned additional number (m) of objects.

* * * * *

(12) EX PARTE REEXAMINATION CERTIFICATE (6178th)
United States Patent
Periwal

(10) Number: US 6,163,776 C1
(45) Certificate Issued: Apr. 8, 2008

(54) SYSTEM AND METHOD FOR EXCHANGING DATA AND COMMANDS BETWEEN AN OBJECT ORIENTED SYSTEM AND RELATIONAL SYSTEM

(75) Inventor: Damodar D. Periwal, Campbell, CA (US)

(73) Assignee: Software Tree, Inc., San Jose, CA (US)

Reexamination Request:
No. 90/007,616, Jul. 6, 2005

Reexamination Certificate for:
Patent No.: 6,163,776
Issued: Dec. 19, 2000
Appl. No.: 09/046,779
Filed: Mar. 23, 1998

Related U.S. Application Data

(60) Provisional application No. 60/051,108, filed on Jun. 26, 1997.

(51) Int. Cl.
*G06F 17/30* (2006.01)

(52) U.S. Cl. .............................. 707/4; 707/6; 707/101; 707/103 R

(58) Field of Classification Search .................... 707/4, 707/6, 101, 103 R, 104.1
See application file for complete search history.

(56) References Cited

U.S. PATENT DOCUMENTS

| | | | | |
|---|---|---|---|---|
| 5,235,701 A | * | 8/1993 | Ohler et al. ..................... | 707/1 |
| 5,295,256 A | * | 3/1994 | Bapat .......................... | 717/137 |
| 5,315,709 A | * | 5/1994 | Alston et al. ................... | 707/6 |
| 5,426,780 A | * | 6/1995 | Gerull et al. ................... | 707/3 |
| 5,542,078 A | * | 7/1996 | Martel et al. ................ | 707/101 |
| 5,627,979 A | | 5/1997 | Chang et al. ............... | 395/335 |
| 5,694,598 A | | 12/1997 | Durand et al. .............. | 395/614 |
| 5,729,739 A | * | 3/1998 | Cantin et al. ........... | 707/103 R |
| 5,799,309 A | * | 8/1998 | Srinivasan .................. | 707/102 |
| 5,838,965 A | * | 11/1998 | Kavanagh et al. ...... | 707/103 R |

(Continued)

OTHER PUBLICATIONS

"Building TOPLink Table Descriptors, Version 2.1", *The Object People Inc.,* (Sep. 1996).
"Enterprise Toolkit", http://www.sunmanagers.org/archives/1996/att-0453/01-part, Retrieved from the Internet on Jun. 7, 2006,(1996).

(Continued)

*Primary Examiner*—Maid A. Banankhah

(57) ABSTRACT

A system for exchanging data and commands between an object oriented system and a relational system. The system includes an Object-Relational Mapping (ORM) grammar, an ORM specification, Object Class Definitions, a relational database, an operating system, a Database Exchange Unit including an OR mapping unit, a schema generator, a schema reverse engineering unit and applications. The ORM specification is based on the ORM grammar and includes information for defining the mapping between object-oriented system and the relational system. The Object Class Definitions define the object-oriented system, and the relational database defines the relational system. The Database Exchange Unit executes in accordance with the ORM specification, and is the programs/routines that operate to translate data from the object model to the relational model, and vice versa. The present invention further comprises a number of methods including: a method for generating a ORM Data Structures; a method for generating a mapping unit; a method for generating a schema from an object model and an object-relational mapping specification; a method for generating an Object Class Definitions and an ORM specification from an ORM template specification and database schema; and a method for object streaming, and methods for efficient generation of persistently unique sequence numbers for new objects.

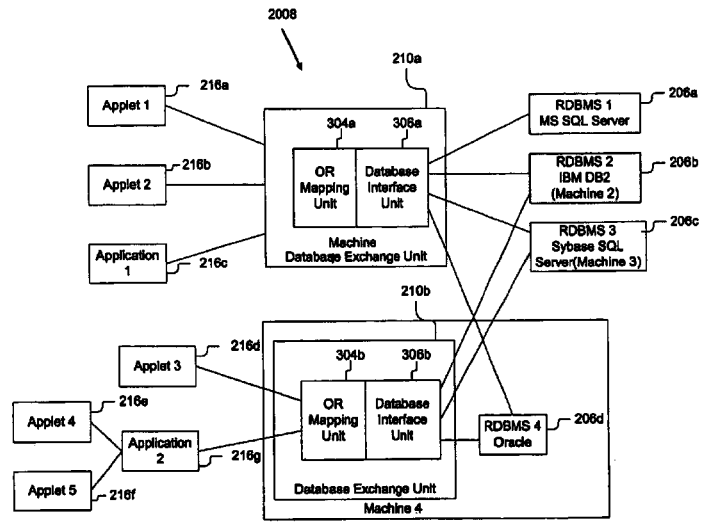

U.S. PATENT DOCUMENTS

| | | | | |
|---|---|---|---|---|
| 5,873,093 | A | * | 2/1999 | Williamson et al. .... 707/103 R |
| 5,878,411 | A | * | 3/1999 | Burroughs et al. ............ 707/4 |
| 5,907,847 | A | * | 5/1999 | Goldberg ................ 707/103 R |
| 5,956,725 | A | * | 9/1999 | Burroughs et al. ......... 707/101 |
| 5,956,730 | A | * | 9/1999 | Burroughs et al. ...... 707/104.1 |
| 6,061,515 | A | * | 5/2000 | Chang et al. ................ 717/114 |
| 6,076,090 | A | * | 6/2000 | Burroughs et al. ......... 707/102 |
| 6,101,502 | A | | 8/2000 | Heubner et al. |
| 6,173,290 | B1 | * | 1/2001 | Goldberg ................ 707/103 R |

OTHER PUBLICATIONS

"Introduction to TOPLink, version 2.1", *The Object People Inc.*, (Sep. 1996).

"TOPLink Employee Demo Reference, Version 2.1", *The Object People Inc.*, (Sep. 1996).

"TopLink v.2.1", *The Object People, Inc.*, (1996).

* cited by examiner

US 6,163,776 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, line 5:
*This application claims the benefit of United States Provisional Application No. 60/051,108, filed on Jun. 26, 1997.*

AS A RESULT OF REEXAMINATION, IT HAS BEEN DETERMINED THAT:

The patentability of claims 36–38 and 40–41 is confirmed.

Claims 1, 4–6, 8, 13, 16–18, 22, 28, 32, 39 and 42 are determined to be patentable as amended.

Claims 2–3, 7, 9–12, 14–15, 19–21, 23–27, 29–31 and 33–35, dependent on an amended claim, are determined to be patentable.

New claims 43–75 are added and determined to be patentable.

1. A system for exchanging data between an object-oriented system and a relational system having tables defining a relational model, the system comprising:
   at least one object class definition defining an object model;
   an object relational mapping (*ORM*) data structure defining a mapping between the object model and the relational model, the object relational mapping data structure produced from a declarative ORM Specification based on an ORM grammar *and from object model information derived using a reflection facility of a programming language*; and
   an exchange unit for translating data from the object model to the relational model and for translating data from the relational model to the object model.

4. The system of claim 1, wherein the exchange unit further comprises:
   an object relational mapping specification defining a mapping between the object model and the relational model, the object relational mapping specification including a plurality of a declarative ORM grammar statements; and
   an ORM Data Structure creation unit having inputs and an output for producing the object relational mapping data structure, the inputs of the ORM Data Structure creation unit coupled to receive the object class definition, the object relational mapping specification, and [the] *data from a* database interface unit, the output of the ORM Data Structure creation unit coupled to the input of [the] *a* mapping unit for providing the object relational mapping data structure.

5. The system of claim 1, further comprising a schema generator, the schema generator having inputs and outputs for generating a file of commands applicable on the relational system [that implement the object call], the input of the schema generator coupled to the object class definition and the object relational mapping data structure, the output of the schema generator coupled to the relational system.

6. The system of claim 5, wherein the schema generator further comprises:
   an ORM Data Structure creation unit having inputs and an output for producing the object relational mapping data structure, the inputs of the ORM Data Structure creation unit coupled to receive the object class definition and the object relational mapping specification;
   a relational schema statements generation unit having an input and an output, the input of the relational schema statements generation unit coupled to the output of the ORM Data Structure creation unit for receiving the object relational mapping data structure, the relational schema statements generation unit producing a file of statements that will produce the relational schema in the relational system; and
   a relational schema statements application unit having an input and an output for applying statements to the relational system, the input of the relational schema statements application *unit* coupled to the output of the relational schema statements generation unit for receiving the file of statements that will produce the relational schema in the relational system, the output of the relational schema statements application unit coupled to the input of [the] *a* database interface unit for applying the statements on the relational system.

8. The system of claim 7, further comprising:
   a plurality of RDBMS Tables stored in the relational system, the plurality of RDBMS Tables setting forth the organization and structure of the data in the relational model in addition to describing certain functionality provided by the relational model; and
   a plurality of ORMMetadata Tables stored in the relational system, the plurality of ORMMetadata Tables storing additional object relational *mapping* specifications.

13. The system of claim 1, further comprising a named sequence generator for generating persistently unique sequence numbers, the named sequence generator having inputs and outputs, the named sequence generator coupled to the relational system [for] *and* coupled to the object-oriented system by the exchange unit.

16. A method for generating an object relational mapping data structure, the method comprising the steps of:
   determining whether an object relational mapping file has been specified;
   if an object relational mapping file has been specified, using an object relational mapping specification identified by the object relational mapping file as the identified object relational mapping specification, *the object relational mapping specification defining a mapping between an object model and a relational model*;
   if an object relational mapping file has not been specified, determining an ORM identification name, retrieving an object relational mapping specification corresponding to the ORM identification name from a relational database, and using the retrieved object relational mapping specification as the identified object relational mapping specification, *the object relational mapping specification defining a mapping between an object model and a relational model*; and creating an object relational mapping data structure using the identified object relational mapping specification.

17. The method of claim 16 wherein the step of determining an ORM identification name further comprises the steps of:
   determining whether an ORM identification name has been specified;
   using the ORM identification name specified if an ORM identification name has been specified; and
   using a default ORM identification name [specified] if an ORM identification name [not] has *not* been specified.

18. A method for generating object relational mapping data structures from an object relational mapping specification [includes the steps of] *comprising*:
   retrieving an object relational mapping specification, *the object relational mapping specification defining a mapping between an object model and a relational model*;
   creating an instance of a plurality of data structures defining a mapping between an object model and a relational model;
   overriding default mappings using a SQL map specification;
   using additional specifications to create additional data structures;
   retrieving Metadata from a database to enhance the plurality of data structures;
   matching class information for object-oriented model with the plurality of data structures;
   [generates] *generating* SQL statements for each class; and
   [generates inserts] *generating SQL insert* and update statements [to apply SQL statements] *for each class to be applied* to the database.

22. A method for generating relational schema from an ORM specification and object class definitions, the method comprising the steps of:
   retrieving an object relational mapping specification, *the object relational mapping specification defining a mapping between an object model and a relational model*;
   retrieving an object class definitions;
   creating an instance of a plurality of data structures defining a mapping between an object model and a relational model;
   overriding default mappings using a SQL map specification;
   using additional specifications to create additional data structures; [and]
   adding relational information to the data structures for each primitive and embedded attribute of the object-oriented model;
   *generating statements for producing and modifying tables in a relational database; and*
   *executing the generated statements on the database.*

28. A method for generating an ORM specification and object class definitions from a database schema, the method comprising the steps of:
   generating object relational mapping data structures using an ORM template specification, *the ORM template specification identifying a table name*;
   [performing at least one] *using the identified table name to perform a* metadata query to retrieve information for the object relational mapping data structures;
   generating an object class definition using the object relational mapping data structures; and
   creating an ORM Specification using object relational mapping data structures.

32. A method for responding to an object *method* call using a mapping unit, the method comprising the steps of:
   determining [the type of object call] *from the object method call an action to be performed on a relational system*;
   setting up an access plan data structure [according to insert flags and insert details] for accessing [referenced] objects *identified by the object method call*;
   creating a command statement for accessing *the* relational system *according to the access plan data structure*;
   issuing the command statement on *the* relational system; and
   processing the data from the relational system to provide it to [the] *an* object-oriented system.

39. The method of claim 36 [wherein the step of] *further comprising:*
   processing the data from the relational system to provide it to the object-oriented system [includes the steps of:];
   creating a SELECT statement and a WHERE clause using the foreign keys for each referenced target class;
   retrieving rows and creating target objects and linking them with referencing complex attributes;
   creating a foreign key entry for each complex attribute of the target class; and
   returning a list of top-level objects to the application.

42. The method of claim [40] *41* wherein the step of retrieving and processing an additional number (m) of objects further comprises the steps of:
   generating a "query fetch" call for the additional number (m) of objects to the database exchange unit;
   invoking a query operation on the saved query context for the additional number (m) of objects;
   retrieving the query cursor saved in the query context;
   processing the query to fetch the additional number (m) of objects;
   returning the additional number (m) of objects; and
   processing the returned additional number (m) of objects.

*43. A system for exchanging data between an object-oriented system and a relational system having tables defining a relational model, the system comprising:*
   *at least one object class definition defining an object model;*
   *an object relational mapping (ORM) data structure defining a mapping between the object model and the relational model, the object relational mapping data structure produced from a declarative ORM Specification based on an ORM grammar;*
   *an exchange unit for translating data from the object model to the relational model and for translating data from the relational model to the object model; and*
   *a schema generator, the schema generator having inputs and outputs for generating a file of commands applicable on the relational system, the input of the schema generator coupled to the object class definition and the object relational mapping data structure, the output of the schema generator coupled to the relational system.*

*44. The system of claim 43, wherein the schema generator further comprises:*
   *an ORM Data Structure creation unit having inputs and an output for producing the object relational mapping data structure, the inputs of the ORM Data Structure* creation unit coupled to receive the object class definition and the object relational mapping specification;

a relational schema statements generation unit having an input and an output, the input of the relational schema statements generation unit coupled to the output of the ORM Data Structure creation unit for receiving the object relational mapping data structure, the relational schema statements generation unit producing a file of statements that will produce the relational schema in the relational system; and a relational schema statements application unit having an input and an output for applying statements to the relational system, the input of the relational schema statements application unit coupled to the output of the relational schema statements generation unit for receiving the file of statements that will produce the relational schema in the relational system, the output of the relational schema statements application unit coupled to the input of a database interface unit for applying the statements on the relational system.

45. A system for exchanging data between an object-oriented system and a relational system having tables defining a relational model, the system comprising:

at least one object class definition defining an object model;

an object relational mapping (ORM) data structure defining a mapping between the object model and the relational model, the object relational mapping data structure produced from a declarative ORM Specification based on an ORM grammar;

an exchange unit for translating data from the object model to the relational model and for translating data from the relational model to the object model; and wherein the system further comprises a security unit having inputs and outputs for determining whether a user can use the ORM Specification and a scope for use of the ORM Specification, the security unit coupled to control access to the object relational mapping data structure and the exchange unit.

46. A system for exchanging data between an object-oriented system and a relational system having tables defining a relational model, the system comprising:

at least one object class definition defining an object model;

an object relational mapping (ORM) data structure defining a mapping between the object model and the relational model, the object relational mapping data structure produced from a declarative ORM Specification based on an ORM grammar;

an exchange unit for translating data from the object model to the relational model and for translating data from the relational model to the object model;

a schema reverse-engineering unit for creating object class definitions and an object relational mapping specification using a database schema; and wherein the schema reverse-engineering unit further comprises:

an ORM template specification containing names of tables to be used for generating object class definitions;

database metadata inquiry unit for accessing the relational system to retrieve metadata including a schema for the relational model and information about the object model, the database metadata inquiry unit coupled to the relational system; and reverse engineering ORM structure creation unit for producing an object relational mapping data structure from metadata, the reverse engineering ORM structure creation unit coupled to the output of the database metadata inquiry unit to receive the metadata and coupled to receive the ORM template specification.

47. The system of claim 1, further comprising a schema generator adapted to create, responsive to receiving a single request, a relational schema having a plurality of tables and constraints, the input of the schema generator coupled to the object class definitions and the object relational mapping data structure, the output of the schema generator coupled to the relational system.

48. The system of claim 47, wherein the schema generator further comprises:

an ORM Data Structure creation unit having inputs and an output for producing the object relational mapping data structure, the inputs of the ORM Data Structure creation unit coupled to receive the object class definitions and the object relational mapping specification;

a relational schema statements generation unit having an input and an output, the input of the relational schema statements generation unit coupled to the output of the ORM Data Structure creation unit for receiving the object relational mapping data structure, the relational schema statements generation unit producing statements that will produce the relational schema in the relational system; and a relational schema statements application unit having an input and an output for applying statements to the relational system, the input of the relational schema statements application unit coupled to the output of the relational schema statements generation unit for receiving the statements that will produce the relational schema in the relational system, the output of the relational schema statements application unit coupled to the input of a database interface unit for applying the statements on the relational system.

49. The system of claim 1, further comprising a schema reverse-engineering unit adapted to create, responsive to receiving a single request, a plurality of object class definitions using a database schema having a plurality of tables and constraints.

50. The system of claim 49, wherein at least two of the object class definitions are interrelated.

51. The system of claim 49, wherein the reverse-engineering unit creates an object relational mapping specification for the object classes.

52. The system of claim 13, further comprising:

a declarative specification of a named sequence generator, the declarative specification describing a name of a sequence and an associated current sequence number, the name and current sequence number stored in a database metadata table.

53. The system of claim 52, wherein the named sequence generator returns a range of sequence numbers based on an increment value.

54. The system of claim 53, wherein returning the range of sequence numbers based on the increment value further comprises the steps of:

beginning a new transaction;

incrementing the current sequence number for the associated named sequence in the database metadata table by the increment value to obtain the range of sequence numbers;

*committing the transaction to the database; and*

*returning the range of sequence numbers.*

*55. The system of claim 52, wherein the sequence numbers are used to assign identifier values to new objects.*

*56. The method of claim 36 further comprising processing the data from the relational system to provide it to the object-oriented system.*

*57. A system for exchanging data between an object-oriented system and a relational system having tables defining a relational model, the system comprising:*

*at least one object class definition defining an object model;*

*an object relational mapping (ORM) data structure defining a mapping between the object model and the relational model;*

*a database interface unit for retrieving and storing data and metadata in the relational system;*

*an ORM data structure creation unit for producing the ORM data structure from the object class definition, a declarative ORM specification based on an ORM grammar, and the metadata from the database interface unit;*

*an exchange unit for translating data from the object model to the relational model and for translating data from the relational model to the object model using the ORM data structure.*

*58. The system of claim 57, further comprising a schema generator, the schema generator having inputs and outputs for generating commands applicable on the relational system, the input of the schema generator coupled to the object class definition and the object relational mapping data structure, the output of the schema generator coupled to the relational system.*

*59. The system of claim 57, further comprising a schema generator adapted to create, responsive to receiving a single request, a relational schema having a plurality of tables and constraints, the input of the schema generator coupled to the object class definitions and the object relational mapping data structure, the output of the schema generator coupled to the relational system.*

*60. The system of claim 57, further comprising a schema reverse-engineering unit for creating object class definitions and an object relational mapping specification using a database schema.*

*61. The system of claim 57, further comprising a schema reverse-engineering unit adapted to create, responsive to receiving a single request, a plurality of object class definitions using a database schema having a plurality of tables and constraints.*

*62. The system of claim 57, further comprising a named sequence generator for generating persistently unique sequence numbers, the named sequence generator having inputs and outputs, the named sequence generator coupled to the relational system and coupled to the object-oriented system by the exchange unit.*

*63. The system of claim 62, further comprising:*

*a declarative specification of a named sequence generator, the declarative specification describing a name of a sequence and an associated current sequence number, the name and current sequence number stored in a database metadata table.*

*64. The system of claim 63, wherein the named sequence generator returns a range of sequence numbers based on an increment value.*

*65. The system of claim 57, wherein the object relational mapping data structure includes a mapping for a stored procedure executable by an engine in the relational system, the stored procedure being invokable by an application program using the exchange unit and creating an object with a value returned by executing the stored procedure.*

*66. A system for exchanging data between an object-oriented system and a relational system having tables defining a relational model, the system comprising:*

*at least one object class definition defining an object model;*

*an object relational mapping data structure defining a mapping between the object model and the relational model, the object relational mapping data structure produced from a declarative ORM Specification based on an ORM grammar;*

*an exchange unit for translating data from the object model to the relational model and for translating data from the relational model to the object model using a reflection facility of a programming language.*

*67. The system of claim 66, wherein the exchange unit further comprises:*

*an object call processing unit having inputs and outputs for receiving object calls and beginning the translation of the object calls, an input and an output of the object call processing unit coupled to the object-oriented system;*

*a mapping unit having inputs and outputs for performing the object-relational mapping according to the object relational mapping specification in response to signals from the object call processing unit, the mapping unit having inputs coupled to the object class definition, the object relational mapping data structure, and input and outputs the object call processing unit; and*

*a database interface unit having inputs and outputs, for retrieving and storing data in the relational system, the inputs and outputs coupled to the relational system and the mapping unit.*

*68. The system of claim 66, further comprising a schema generator, the schema generator having inputs and outputs for generating commands applicable on the relational system, the input of the schema generator coupled to the object class definition and the object relational mapping data structure, the output of the schema generator coupled to the relational system.*

*69. The system of claim 66, further comprising a schema generator adapted to create, responsive to receiving a single request, a relational schema having a plurality of tables and constraints, the input of the schema generator coupled to the object class definitions and the object relational mapping data structure, the output of the schema generator coupled to the relational system.*

*70. The system of claim 66, further comprising a schema reverse-engineering unit for creating object class definitions and an object relational mapping specification using a database schema.*

*71. The system of claim 66, further comprising a schema reverse-engineering unit adapted to create, responsive to receiving a single request, a plurality of object class definitions using a database schema having a plurality of tables and constraints.*

*72. The system of claim 66, further comprising a named sequence generator for generating persistently unique* sequence numbers, the named sequence generator having inputs and outputs, the named sequence generator coupled to the relational system and coupled to the object-oriented system by the exchange unit.

73. The system of claim 72, further comprising:
   a declarative specification of a named sequence generator, the declarative specification describing a name of a sequence and an associated current sequence number, the name and current sequence number stored in a database metadata table.

74. The system of claim 73, wherein the named sequence generator returns a range of sequence numbers based on an increment value.

75. The system of claim 66, wherein the object relational mapping data structure includes a mapping for a stored procedure executable by an engine in the relational system, the stored procedure being invokable by an application program using the exchange unit and creating an object with a value returned by executing the stored procedure.

* * * * *